US012574141B2

(12) United States Patent
Le Bars et al.

(10) Patent No.: US 12,574,141 B2
(45) Date of Patent: Mar. 10, 2026

(54) METHOD AND APPARATUS FOR SIGNALING SUSPENSION AND RESUMPTION OF NETWORK CODING OPERATION

(71) Applicant: CANON KABUSHIKI KAISHA, Tokyo (JP)

(72) Inventors: Philippe Le Bars, Thorigne-Fouillard (FR); Pierre Visa, Rennes (FR); Pascal Lagrange, La Chapelle des Fougeretz (FR); Romain Guignard, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 17/926,377

(22) PCT Filed: May 19, 2021

(86) PCT No.: PCT/EP2021/063372
§ 371 (c)(1),
(2) Date: Nov. 18, 2022

(87) PCT Pub. No.: WO2021/234044
PCT Pub. Date: Nov. 25, 2021

(65) Prior Publication Data
US 2023/0188249 A1      Jun. 15, 2023

(30) Foreign Application Priority Data
May 20, 2020      (GB) ..................................... 2007549

(51) Int. Cl.
*H04L 1/00* (2006.01)

(52) U.S. Cl.
CPC .......... *H04L 1/0009* (2013.01); *H04L 1/0025* (2013.01); *H04L 1/0041* (2013.01); *H04L 1/0075* (2013.01); *H04L 1/0076* (2013.01)

(58) Field of Classification Search
None
See application file for complete search history.

(56) References Cited

U.S. PATENT DOCUMENTS

| | | | | |
|---|---|---|---|---|
| 10,425,988 B1* | 9/2019 | Kim | ...................... | H04L 5/0055 |
| 2007/0147338 A1* | 6/2007 | Chandra | ............... | H04W 8/245 |
| | | | | 370/350 |

(Continued)

FOREIGN PATENT DOCUMENTS

| | | |
|---|---|---|
| CN | 103765932 A | 4/2014 |
| CN | 108604942 A | 9/2018 |

(Continued)

OTHER PUBLICATIONS

R. Annur, O. Y. Hui, N. Jalil, F. Subri and V. Ponnusamy, "Cooperative Device to Device Communications with Network Coding," 2020 IEEE 7th International Conference on Engineering Technologies and Applied Sciences (ICETAS), Kuala Lumpur, Malaysia, 2020, pp. 1-4, (Year: 2020).*

(Continued)

*Primary Examiner* — Daniel F. McMahon
(74) *Attorney, Agent, or Firm* — Canon U.S.A., Inc. IP Division

(57) ABSTRACT

A method of wireless communication between a base station and a user equipment to signal network coding suspension and resumption of a device in a radio communication system, wherein the method includes receiving a network coding control element; and controlling activation or deactivation of network coding in response to the reception of the network coding control element, wherein the controlling comprises determining an indication of when the network coding activation or deactivation takes effect, the indication being an identifier of a first data packet for which the network coding is activated or deactivated.

22 Claims, 35 Drawing Sheets

(56) References Cited

U.S. PATENT DOCUMENTS

| | | | | |
|---|---|---|---|---|
| 2011/0164621 A1* | 7/2011 | Lee | .................... | H04L 1/0076 |
| | | | | 370/400 |
| 2011/0269490 A1 | 11/2011 | Earnshaw | | |
| 2016/0021599 A1* | 1/2016 | Fitzek | ............... | H04W 40/248 |
| | | | | 370/310 |
| 2018/0324642 A1 | 11/2018 | Yu-Ting et al. | | |
| 2018/0359050 A1* | 12/2018 | Lauridsen | ............ | H04L 1/0011 |
| 2020/0228935 A1* | 7/2020 | Elia | ........................ | H04W 4/06 |
| 2021/0127296 A1* | 4/2021 | Akl | ...................... | H04W 40/02 |
| 2021/0392472 A1* | 12/2021 | Zhou | ................... | H04L 1/1896 |
| 2022/0021490 A1* | 1/2022 | Zhou | ................... | H04L 1/1819 |
| 2022/0094627 A1* | 3/2022 | Chen | ..................... | H04L 45/24 |

FOREIGN PATENT DOCUMENTS

| | | | |
|---|---|---|---|
| EP | 3422622 A1 | 1/2019 | |
| EP | 4101097 A1 | 12/2022 | |
| JP | 2020502854 A | 1/2020 | |
| KR | 20190000401 A | 1/2019 | |
| KR | 20200004349 A | 1/2020 | |
| WO | 2018172136 A1 | 9/2018 | |
| WO | 2018204828 A | 11/2018 | |
| WO | 2019031490 A | 2/2019 | |
| WO | 2019160863 A1 | 8/2019 | |
| WO | 2021155947 A1 | 8/2021 | |

OTHER PUBLICATIONS

Discussion on the application of Network Coding for efficient PDCP Duplication with more than 2 copies; China Unicom; Aug. 2019; R3-194503; 3GPP TSG-RAN WG3 Meeting #105; pp. 1-3.

Jun Yuan, et al., Proposal for Link Adaptation via Network Coding in IEEE 802.16m, IEEE C802.16m-08/616, IEEE, Internet <URL:http://www.ieee802.org/16/tgm/docs/C80216m-08_616.pdf>, Jul. 7, 2008, pp. 1-17.

Use cases and options for network coding in IAB; Intel Corporation, AT&T; RP-192535; 3GPP TSG RAN Meeting #86; Sitges, Spain, Dec. 9-12, 2019; pp. 1-8.

Xu Guoping et Al., Problems on application of carrier aggregation and related Promotion practice, Dec. 28, 2017.

Huawei, CA activation and deactivation in NR, 3GPP TSG-RAN WG2 Meeting #99, Aug. 21-25, 2017, Berlin, Germany.

* cited by examiner

2001   Base station checks the need for suspending/resume Network Coding in a communication with a UE connected to this base station 2002   Base Station stores/loads the Network Coding configuration 2003   Base station sends a suspend/resume command 2004   Base Station receives a Suspend/resume Complete message 2005   Base Station suspends/resume Network Coding

2000

UE receives a Network Coding Suspend/Resume command

2101

UE stores/loads the network coding configuration

2102

UE sends a Suspend/Resume Complete message

2103

UE suspends/Resumes Network Coding

2104

2100

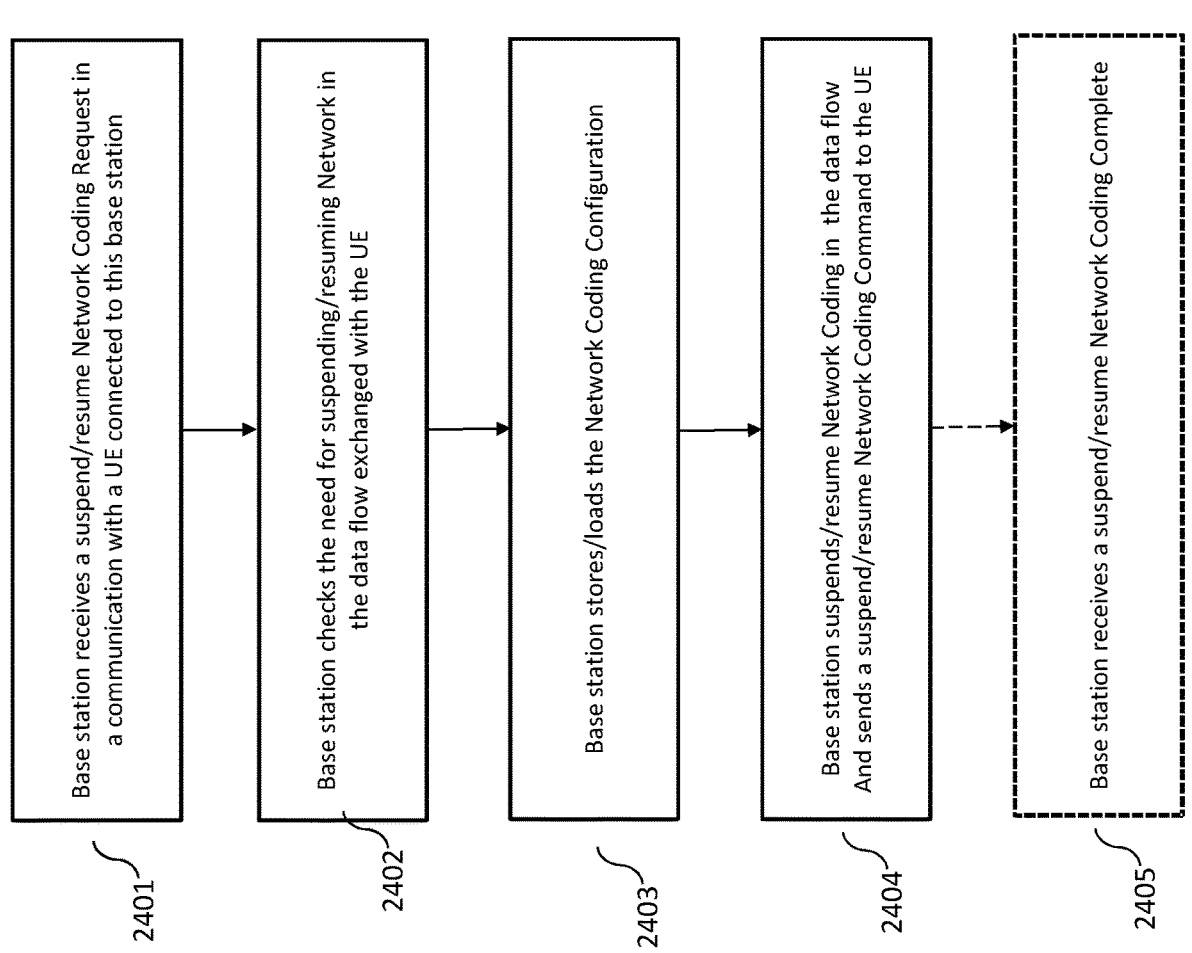

Figure 24

2401 Base station receives a suspend/resume Network Coding Request in a communication with a UE connected to this base station 2402 Base station checks the need for suspending/resuming Network in the data flow exchanged with the UE 2403 Base station stores/loads the Network Coding Configuration 2404 Base station suspends/resume Network Coding in the data flow And sends a suspend/resume Network Coding Command to the UE 2405 Base station receives a suspend/resume Network Coding Complete

2400

UE sends a Network Coding suspend/receive Request to the Base Station    2501

UE receives a Suspend/resume Network Coding Command    2502

UE stores /loads the Network Coding Configuration    2503

UE suspends/resume Network Coding    2504

UE sends a suspend/resume Network Coding Complete    2505

2500

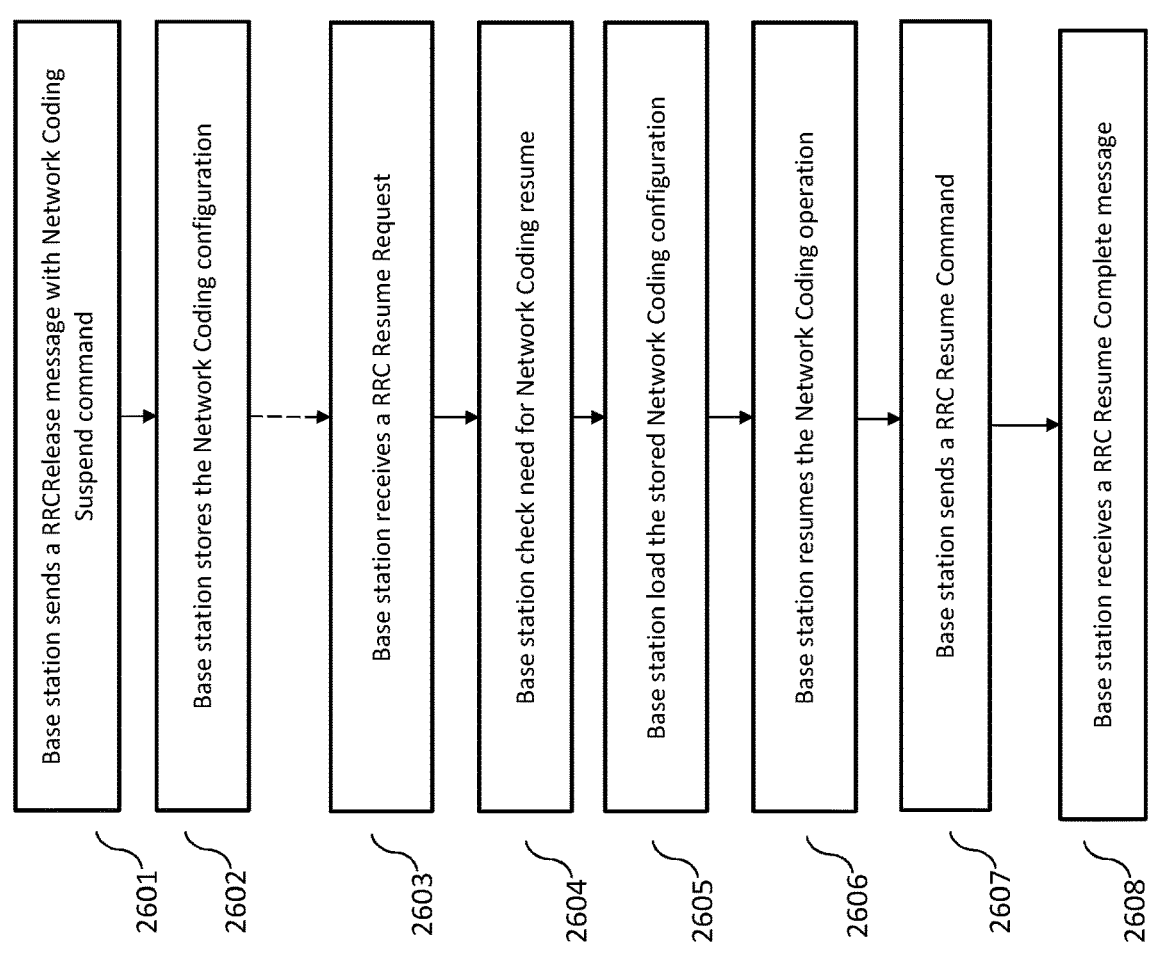

Figure 26

Base station sends a RRCRelease message with Network Coding Suspend command

2601

Base station stores the Network Coding configuration

2602

Base station receives a RRC Resume Request

2603

Base station check need for Network Coding resume

2604

Base station load the stored Network Coding configuration

2605

Base station resumes the Network Coding operation

2606

Base station sends a RRC Resume Command

2607

Base station receives a RRC Resume Complete message

2608

2600

2801  Device A checks the need for Network Coding suspension/resuming

2802  Device A stores/loads the Network Coding configuration

2803  Device A suspend/resume Network Coding

2804  Device A sends a suspend/resume network coding notification

2800

2901  Device B receives a Network Coding Suspension/resuming notification

2902  Device B stores/loads the Network Coding configuration

2903  Device B suspend/resume Network Coding

2900

Base station resumes Network Coding according to the Network Coding configuration

3001

Base station sends Network Coding information to the UE along with one or more Network Coded data packets

3002

3000

UE receives a data packet embedding Network Coding information along with Network Coded data payload

3101

UE resumes Network Coding according to the Network Coding configuration and Network Coding information

3102

3100

Base station suspends Network Coding

3201

Base station sends Network Coding suspension information to the UE along with one or more Network Coded data packets

3202

3200

UE receives a data packet embedding Network Coding suspension information

3301

UE suspends Network Coding according to the Network Coding suspenson information

3302

3300

3400

METHOD AND APPARATUS FOR SIGNALING SUSPENSION AND RESUMPTION OF NETWORK CODING OPERATION

CROSS-REFERENCE TO RELATED APPLICATIONS

This application is the National Phase application of PCT Application No. PCT/EP2021/063372, filed on May 19, 2021 and titled "METHOD AND APPARATUS FOR SIGNALING SUSPENSION AND RESUMPTION OF NETWORK CODING OPERATION". This application claims the benefit under 35 U.S.C. § 119(a)-(d) of United Kingdom Patent Application No. 2007549.5, filed on May 20, 2020 and entitled "METHOD AND APPARATUS FOR SIGNALING SUSPENSION AND RESUMPTION OF NETWORK CODING OPERATION". The above cited patent applications are incorporated herein by reference in their entireties.

FIELD OF THE INVENTION

The present disclosure concerns a method and a device for signalling network coding suspension and resumption of a device in a radio communication system along with the associated control protocol for the suspend/resume operation of network coding. It concerns more particularly data transmission robustness improvement for Ultra Reliable Low Latency Communications (URLLC).

BACKGROUND OF INVENTION

Wireless communication systems are largely deployed to address a wide range of applications, ranging from mobile broadband, massive machine type communications to Ultra Reliable Low Latency Communications (URLLC). Such systems allow a plurality of user equipments (UE) or mobile terminals (MT) to share the wireless medium to exchange several types of data content (e.g. video, voice, messaging . . . ) over a radio access network (RAN) through one or more base stations. Examples of such wireless multiple-access communication systems include systems based on 3rd generation partnership project (3GPP) standards, such as fourth-generation (4G) Long Term Evolution (LTE) or recent fifth-generation (5G) New Radio (NR) systems, or systems based on IEEE 802.11 standards, such as WiFi.

URLLC type of communication is particularly relevant in an Industrial Internet of Things (I-IoT or IIOT or IIoT) environment where communication reliability, and thus communication service availability, is essential to prevent service disruption, while low-latency, which relates to the end-to-end delay of the communication, is required, for instance to avoid introducing downtime of equipments or to ensure predictive deterministic data reception.

Several techniques may be considered to ensure communication reliability, such as Automatic Repeat request (ARQ) or on-demand retransmission schemes based on acknowledge messaging, even though the low-latency requirement would be hardly met.

To reduce this issue, a mechanism of packet duplication is provided, known as Packet Data Convergence Protocol (PDCP)T duplication in 3GPP and described in the specification TS 38.323, where the packets are systematically sent and received over two different carrier frequencies instead of one. However, packet duplication is not optimal as it suffers from a lack of coding diversity while doubling the bandwidth requirements.

The introduction of network coding for the RAN communications leads to consider an appropriate signaling between the involved radio devices, i.e. the UE and the base station. Network coding is known to be an efficient technique to achieve low packet error ratio with a minimum redundancy. Compared to the aforementioned techniques, it provides the same level of robustness while lowering bandwidth consumption.

Then, in operation, the devices shall be able to react quickly to conditions changes, like a degradation or an improvement of radio links quality, a need to free bandwidth for priority traffic, or a need to reduce processing load (e.g. overheating situation). As a consequence, the network coding operation must be capable of fast interruptions and resumptions.

Several 3GPP specifications document (TS 38.300, TS 37.340, TS 38.323, TS 38.331 . . . ) provide specifications for mufti-connectivity or PDCP duplication set-up.

SUMMARY OF THE INVENTION

The present invention has been devised to address one or more of the foregoing concerns. It provides a signalling method to establish a shared Network Coding (NC) configuration between 5G devices along while describing the associated control protocol for the suspend/resume operations.

In one embodiment of the invention the Network Coding (NC) suspend/resume notification is established by means of a MAC CE (MAC Control Element) carried in a MAC sub-header of a packet. In another aspect of the invention, the Network Coding (NC) suspend/resume notification is established by means of a specific field added in an information element (IE) carried in one or more Radio Resource Control (RRC) messages. In another embodiment on the invention, the Network Coding (NC) suspend/resume command is embedded in a dedicated field of the encoded data packets.

In one embodiment of the invention, the Network Coding (NC) configuration process, as well as the Network Coding (NC) suspend/resume process, are controlled by the base station. In another embodiment of the invention, the UE may transmit a request for suspend/resume by sharing status information carried in RRC messages.

In one embodiment of the invention, the protocol messages used for both Network Coding (NC) configuration and Network Coding (NC) suspend/resume processing belong to a set of messages standardized by 3GPP.

Suspend/resume operation differs from activation/deactivation by their short time of validity, and by the fact that reconfiguration is not to be used, the device resume Network Coding with a configuration that is identical to the one used prior to the suspension.

According to a first aspect of the invention, there is provided a method of wireless communication between a base station and a user equipment, wherein the method comprises:

receiving a network coding control element; and
  controlling the network coding activation or deactivation in response to the reception of the control element.

In an embodiment, the receiving step and the controlling step are executed by the base station, the network coding control element being transmitted by the user equipment.

In an embodiment, the receiving step and the controlling step are executed by the user equipment, the network coding control element being transmitted by the base station.

In an embodiment, the method further comprises:
transmitting by the user equipment to the base station of a request for network coding activation or deactivation prior to the transmission of the network coding control element by the base station.

In an embodiment, wherein the method further comprises:
transmitting by the user equipment to the base station, upon reception of the network coding control element, of an acknowledge message to acknowledge the reception of the network coding control element.

In an embodiment, wherein the method further comprises:
transmitting by the user equipment to the base station of a status report prior to the transmission of the network coding control element by the base station.

In an embodiment, the network coding control element is embedded in a Media Access Control Control Element.

In an embodiment, the network coding control element is embedded in a header of a Packet Data Convergence Protocol message.

In an embodiment, the network coding control element is embedded in a Radio Resource Control message.

In an embodiment, the method further comprises:
checking the need for network coding activation or deactivation prior to transmitting the network coding control element.

In an embodiment, checking the need for network coding activation or deactivation is at least based on the processor condition.

In an embodiment, checking the need for network coding activation or deactivation is at least based on the battery status.

In an embodiment, checking the need for network coding activation or deactivation is at least based on Quality of Service modification.

In an embodiment, checking the need for network coding activation or deactivation is at least based on channel quality modification detection.

In an embodiment, checking the need for network coding activation or deactivation is at least based on reception of a buffer status report.

In an embodiment, the step of controlling the network coding deactivation consists in suspending the encoding of data packets according to a predefined network coding configuration.

In an embodiment, the step of controlling the network coding deactivation consists in suspending the decoding of data packets according to a predefined network coding configuration.

In an embodiment, the step of controlling the network coding activation consists in resuming the encoding of data packets according to a predefined network coding configuration.

In an embodiment, the step of controlling the network coding activation consists in resuming the decoding of data packets according to a predefined network coding configuration.

In an embodiment, the method further comprises:
storing in a local memory of the network coding configuration used for encoding or decoding the data packets.

In an embodiment, the predefined network coding configuration used for resuming encoding or decoding of data packets is the last used network coding configuration.

In an embodiment, the request for network coding activation or deactivation is embedded in a Media Access Control Control Element.

In an embodiment, the request for network coding activation or deactivation is embedded in a header of a Packet Data Convergence Protocol message.

In an embodiment, the request for network coding activation or deactivation is embedded in a Radio Resource Control message.

In an embodiment, the acknowledge message is embedded in a Media Access Control Control Element.

In an embodiment, the acknowledge message is embedded in a header of a Packet Data Convergence Protocol message.

In an embodiment, the acknowledge message is embedded in a Radio Resource Control message.

In an embodiment, the network coding activation is performed at the base station after the reception of the acknowledge message.

In an embodiment, the network coding deactivation is performed at the base station after the reception of the acknowledge message.

In an embodiment, the network coding control element comprises an information on the data radio bearers for which the network coding is to be activated or deactivated.

In an embodiment, the controlling step comprises:
transmission of a network coding activation or deactivation notification to indicate when the network coding activation or deactivation takes effect.

In an embodiment, the activation or deactivation notification indicates the first data packet for which the network coding is activated or deactivated.

In an embodiment, the network coding activation or deactivation notification comprises an information on the data radio bearers for which the network coding is to be activated or deactivated.

In an embodiment, the network coding activation or deactivation notification is embedded in a header of a Packet Data Convergence Protocol message.

According to another aspect of the invention, there is provided a computer program product for programmable devices, the computer program product comprising a sequence of instructions for implementing a method according to the invention, when loaded into and executed by the programmable devices.

According to another aspect of the invention, there is provided a computer-readable storage medium storing instructions of a computer program for implementing a method according to the invention.

According to another aspect of the invention, there is provided a computer program which upon execution causes the method of the invention to be performed.

According to another aspect of the invention, there is provided a user equipment device for wireless communication with a base station, wherein the user equipment device comprises a processor configured for:
receiving a network coding control element; and
controlling the network coding activation or deactivation in response to the reception of the control element.

According to another aspect of the invention, there is provided a base station device for wireless communication with a user equipment, wherein the base station device comprises a processor configured for:
receiving a network coding control element; and
controlling the network coding activation or deactivation in response to the reception of the control element.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 24 illustrates a flowchart illustrating a method that supports Network Coding suspend/resume operation through a MAC sub header, at the Base Station level with optional confirmation of execution according to an embodiment of the invention.

FIG. 26 illustrates a flowchart illustrating a method that supports Network Coding resume operation through a MAC sub header, at the Base Station level, after a UE Power Saving mode according to an embodiment of the invention.

DETAILED DESCRIPTION OF THE INVENTION

Figure 1:
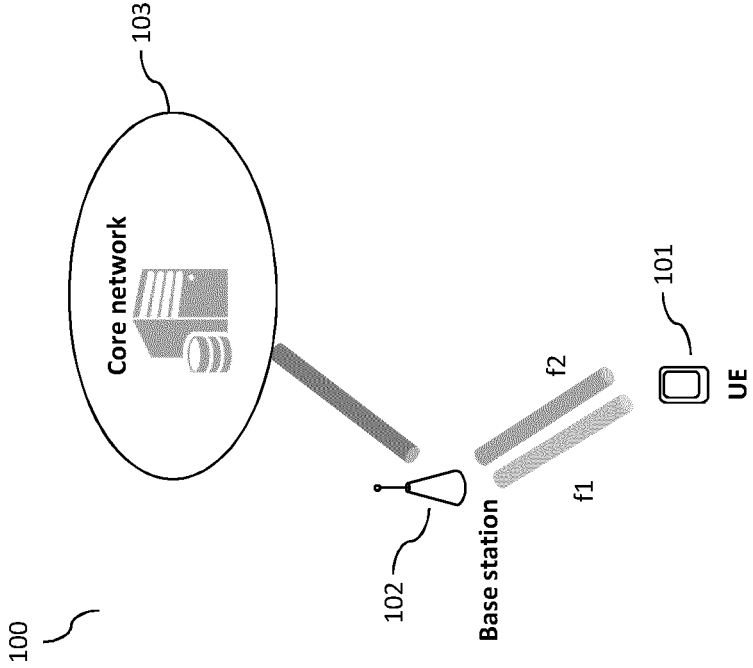
FIG. 1 illustrates a radio access network (RAN) topology with carrier aggregation allowing the operation of a network coding scheme.

FIG. 1 illustrates a radio access network (RAN) topology with carrier aggregation allowing the operation of a network coding scheme.

It presents an example of a wireless communication system 100, such as a 5G NR (New Radio) network that may benefit from the invention. The wireless communication system includes User Equipment (UE) 101, and a base station 102, which may communicate wirelessly with the UE. Several other UEs, and other bases stations not represented on the figure, may also be part of this system. The wireless communication system may be a New Radio (NR) network, a Long term Evolution (LTE) network or a LTE-Advanced (LTE-A) network. The base station may refer, without limitation, to a radio transceiver, an eNodeB (eNB) or a next-generation Node B (gNB). UE 101 may be capable of communicating with any kind of base station or with a limited type of base station through the Radio Access Network (RAN).

Base station 102 is connected to the core network 103, which may be, for instance, a 5G Core (5GC) or an Evolved Packet Core (EPC). The connection between the base station and the core network entities may be either wired or wireless.

Carrier aggregation (CA) mechanism may be implemented, allowing UE 101 and base station 102 to communicate simultaneously over two different component carrier frequencies denoted f1 and f2. The radio cell defined by the coverage area of f1 is called the Primary Cell, while f2 defines a secondary cell.

Carrier aggregation has been introduced in 4G/LTE standards and enhanced in 5G NR. Other wireless communication standards, such as the latest WiFi generations, also rely on such mechanism. The first objective of carrier aggregation is to increase the data rate per user by transmitting different data over multiple frequency blocks, also referred to as component carriers. Carrier aggregation may be applied to both downlink (DL) transmissions, from base station to UE, and uplink (UL) transmissions, from UE to base station.

One other benefit of carrier aggregation is to offer both time and frequency diversity to error correcting schemes, such as packet duplication or network coding.

According to the PDCP duplication method described in TS 38.323, data coming from the core network 103 are transmitted in the form of Protocol Data Units (PDUs) by base station 102 to UE 101 over one component carrier frequency f1, while a copy of these PDUs are transmitted to UE 101 over a different component carrier frequency f2, simultaneously or not.

In the context of network coding, according to some embodiments of the invention, a first set of linear combinations may be transmitted over f1, while a second set of linear combinations may be transmitted over f2. In some embodiments of the invention, the transmission of linear combinations does not rely on Carrier Aggregation i.e. the linear combinations are sent on the same frequency but it is not optimal as the system loses frequency diversity.

Figure 2:
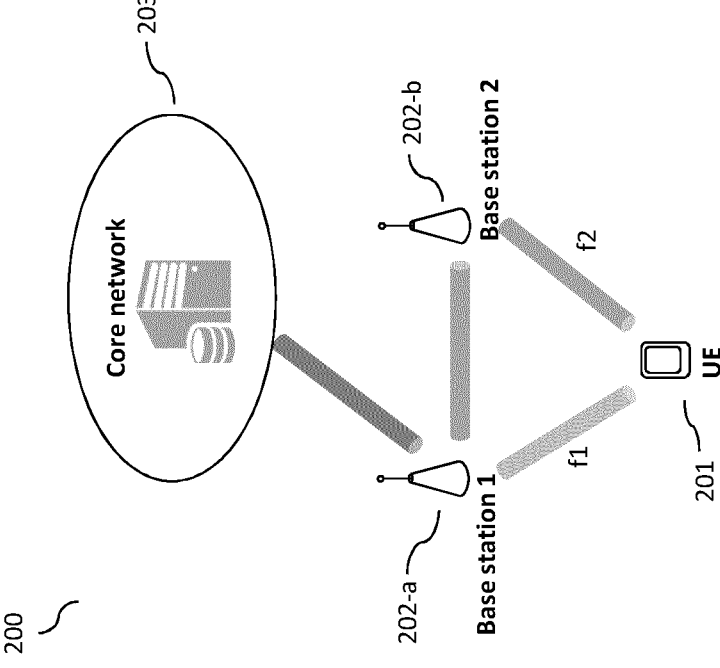
FIG. 2 illustrates a radio access network (RAN) topology with dual-connectivity allowing the operation of a network coding scheme.

FIG. 2 illustrates a radio access network (RAN) topology with dual-connectivity allowing the operation of a network coding scheme.

The figure presents a wireless communication system 200, such as a 5G NR (New Radio) network, that may benefit from the invention. The wireless communication system includes User Equipment (UE) 201, and two base stations 202-a and 202-b, which may communicate wirelessly with the UE. Several other UEs, not represented on the figure, may also be part of this system. The wireless communication system may be a New Radio (NR) network, a Long term Evolution (LTE) network or a LTE-Advanced (LTE-A) network. Each of the base station may refer, without limitation, to a radio transceiver, an eNodeB (eNB) or a next-generation Node B (gNB). UE 102 may be capable of communicating with any kind of base stations or with a limited type of base stations.

Base stations 202-a and 202-b are connected to core network 203, which may be, for instance, a 5G Core (5GC) or an Evolved Packet Core (EPC). The connection between the base stations and the core network entities, as well as the connection between the two base stations, may be either wired or wireless.

Dual-connectivity (DC) mechanism may be implemented, where UE 201 and base station 202-a communicate directly using the f1 frequency band, and where UE 201 also communicates with base station 202-a through base station 202-b using f2 frequency band. In this particular configuration, base station 202-a is referred to as the master node (MN) while f1 frequency band defines a Master Cell Group (MCG). Base station 202-b is referred to as the secondary node (SN) and f2 frequency band defines a Secondary Cell Group (SCG).

In some embodiments, f1 frequency and f2 frequency are the same.

Similar to Carrier aggregation (CA), Dual Connectivity (DC) has been introduced by 3GPP in 4G/LTE standards and enhanced in 5G NR, with the objective to increase user throughput, provide mobility robustness, and support load-balancing amongst base stations. It is applicable to both downlink (DL) and uplink (UL) transmissions.

The other benefit of DC is to offer not only time and frequency diversity, but also spatial diversity to error correcting schemes, such as packet duplication or network coding.

According to the PDCP duplication method described in TS 38.323, data coming from core network 203 are transmitted in the form of Protocol Data Units (PDUs) directly by base station 202-a to UE 201 via the MCG, while a copy of these PDUs are transmitted by base station 202-a to the base station 202-b, which forwards these PDUs to the UE 201 via the SCG. At protocol level, it is said that each PDU is transmitted over a split Data Radio Bearer (DRB), or split bearer, where the same DRB is used on both the MCG and SCG (it is actually split between the MCG and the SCG).

Similarly, in the context of network coding, according to some embodiments of the invention, a first set of linear combinations is transmitted directly by base station 202-a to the UE 201, while a second set of linear combinations is transmitted by base station 202-a to UE 201 through base station 202-b.

FIG. 1 and FIG. 2, illustrate two possible communication channels (also referred to as legs) between a base station and a UE. However, the one skilled in the art knows that 5G NR specifications does not limit CA and DC to two legs. More legs may be available by adding other component carriers in CA, or by adding secondary base stations in DC. As a generalization, a multi-connectivity scheme can be established between a UE and a base station that would involve a plurality of additional base stations. Details on Carrier aggregation (CA) and Dual Connectivity (DC) are available in the specifications documents TS 38.300 and TS 37.340.

Figure 3:
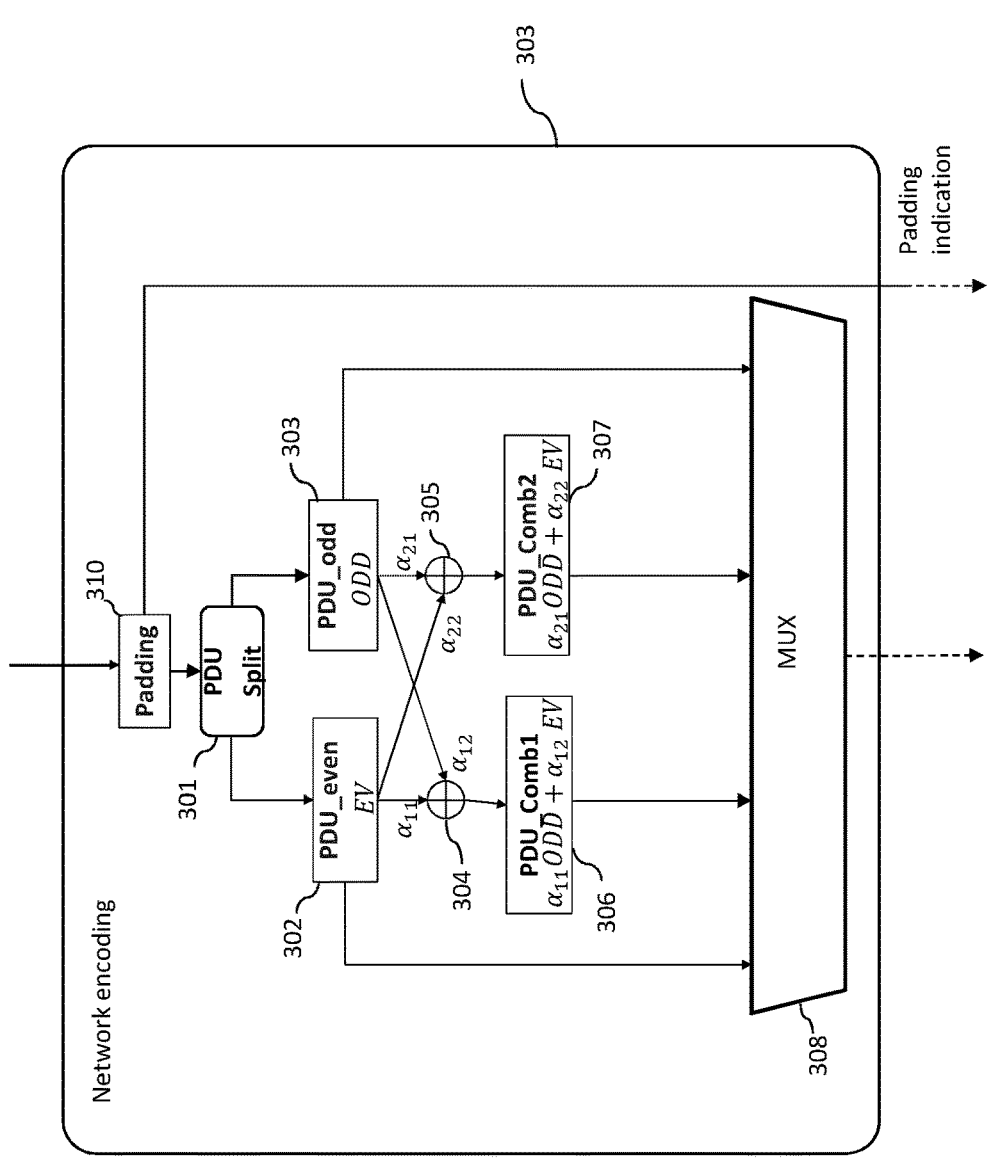
FIG. 3 illustrates an example of network coding scheme with the operations on the transmitter side.

FIG. 3 illustrates an example of network coding scheme with the operations on transmitter side.

It presents an example of network coding scheme, focusing on the encoding aspect of network coding, to be performed by a NC encoder module 300. An incoming PDU is first processed by a padding function 310. If the length of the incoming PDU is odd, one byte of dummy data (all zeroes for example) is appended to the PDU and the padding indication is set as an input for the transmission buffer 308 also in charge of headers processing. The PDU is then processed by PDU splitter 301, which splits the PDU into two parts.

The split may be performed in many different ways. One way to perform the split action is to divide a PDU into two parts of equal size: the (PDU_length/2) first bytes are placed in a so-called even packet, also referred to as EVEN PDU, or EVEN, while the following bytes are gathered in a so-called odd packet, also referred to as ODD PDU, or ODD. As an example of other implementation 1 byte every 2 bytes can be sorted and placed in the EVEN and ODD PDUs. The one skilled in the art may consider other split schemes.

The two parts are stored in buffer 302 for the EVEN PDU, and in buffer 303 for the ODD PDU. Splitting the PDU into two parts is beneficial as reducing the length of transmitted packets reduces the probability of having one bit corrupted during the transmission. Therefore, this also reduces the need for retransmissions that would result from the reception of a corrupted packet.

Through the transmission buffer 308, 4 PDUs will be output. EVEN, ODD, and two PDUs resulting from combinations of EVEN and ODD. The first combined packet, referred to as COMB1 and stored in buffer 306, results from the addition byte to byte of the result of byte to byte multiplications by two different coefficients $\alpha_{11}$ and $\alpha_{12}$ of the bytes within ODD and EVEN (performed by multiply and add unit 304). The second combined packet, referred to as COMB2 and stored in buffer 307, results from the addition byte to byte of the result of byte to byte multiplications by two different coefficients $\alpha_{21}$ and $\alpha_{22}$ of the bytes within ODD and EVEN (performed by multiply and add unit 305).

In some embodiments of the invention, (but non limitative), the operations are made in the Galois Field GF256. Not all sets of 4 coefficients in GF 256 can be used. A plurality of ones and zeros must be excluded, as they would let the original data unchanged and ($\alpha_{11} \times \alpha_{12}$) shall not be equal to ($\alpha_{21} \times \alpha_{22}$), otherwise the linear combinations would be identical.

A sequence number may also be assigned in transmission buffer 308. The format of such sequence number may be (4n+t), where t belongs to {0,1,2,3}. For instance, the sequence number of any ODD PDU will be in the form 4n (t=0), the sequence number of any EVEN PDU will be in the form (4n+1), the sequence number of any COMB1 PDU will be in the form (4n+2), and the sequence number of any COMB2 PDU will be in the form (4n+3).

Eventually, the four encoded PDUs—i.e. ODD, EVEN, COMB1 and COMB2—are transmitted over different legs (see also FIG. 1 and FIG. 2). For instance ODD and COMB1 are transmitted on a first leg, while EVEN and COMB2 are transmitted on the second leg.

Figure 4:
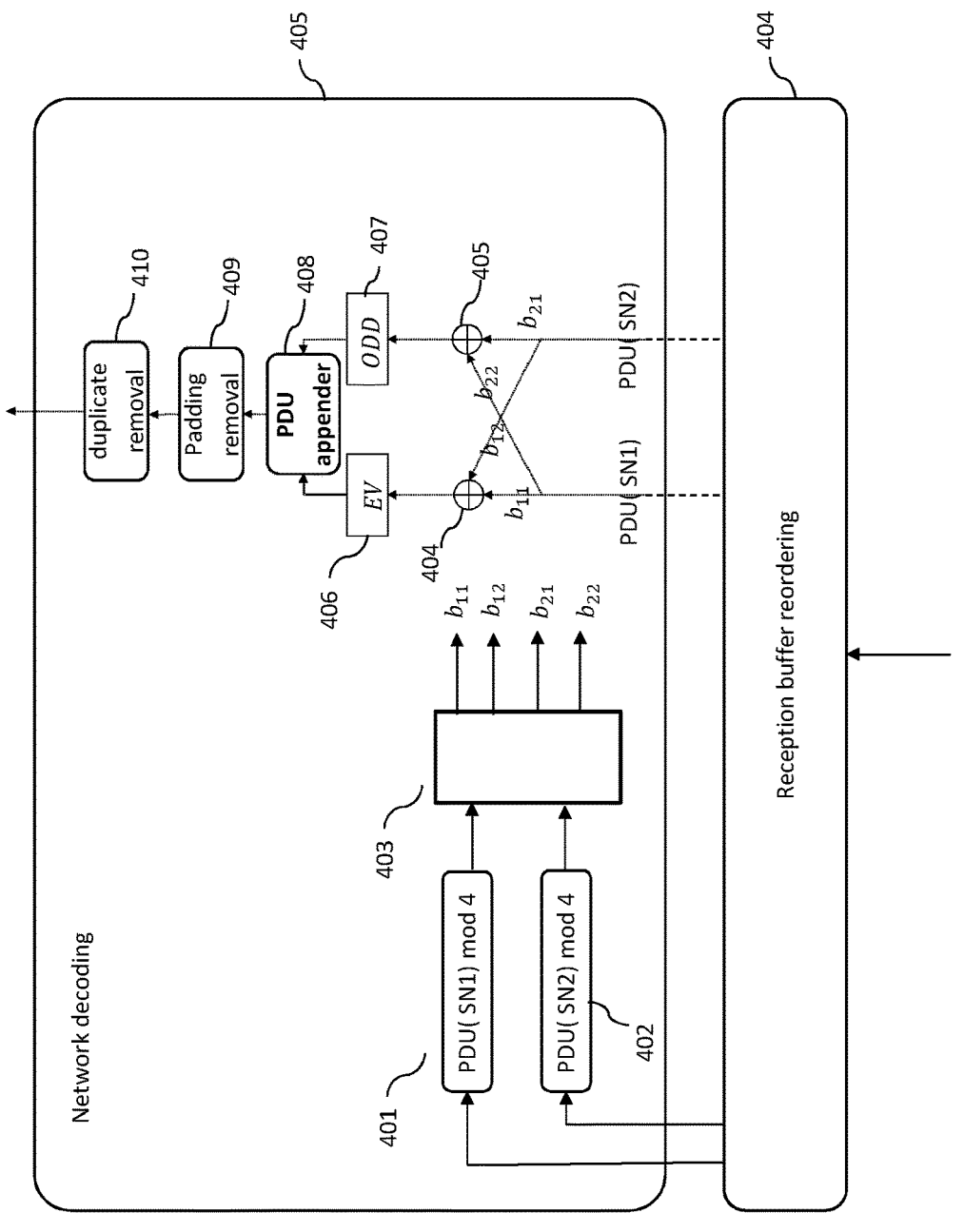
FIG. 4 illustrates an example of network coding scheme with the operations on the receiver side (following the encoding operations depicted in the FIG. 3).

FIG. 4 illustrates an example of network coding scheme with the operations on the receiver side corresponding to the encoding operations depicted in FIG. 3.

This example focuses on the decoding aspect of network coding, to be performed by a NC decoder module 400.

Each received encoded PDU (ODD, EVEN, COMB1, or COMB2) goes to reception buffer 411. Padding indication associated to the received PDU may be extracted and passed to the padding removal function 409. In reception buffer 411, the received PDUs may be reordered according to their sequence number. Any sequence number divided by 4 produces a quotient n and a remainder r. Any two PDUs sharing the same quotient n (i.e. any two out of EVEN, ODD, COMB1 and COMB2) are sufficient to reconstruct the original PDU. According to the remainders calculated in the modules 401 and 402 of any two received PDUs, a specific set of 4 coefficients ($b_{11}$, $b_{12}$, $b_{21}$ and $b_{22}$) is needed to reconstruct the packet. Example: if ODD and EVEN were received, the coefficients will be the identity matrix ($b_{11}=1$, $b_{12}=0$, $b_{21}=0$ and $b_{22}=1$).

The remainders out of module 401, also referred to as Rem(SN1), and out of module 402, also referred to as Rem(SN2), of any pair of received PDUs are thus the inputs of a lookup table 403.

Description of the lookup table 403:

Each byte of the 2 received encoded PDUs, respectively byte(SN1,x) and byte(SN2,x), x indicating the position of the byte in the packet, will form a vector $$\begin{pmatrix} \text{byte}(SN1,x) \\ \text{byte}(SN2,x) \end{pmatrix}.$$

This vector will be multiplied by a matrix M, the result being the 2 parts corresponding to the original PDU. 6 cases usually happen:

$1^{st}$ case) EVEN is received, ODD is received. Rem(SN1)=0 and Rem(SN2)=3, the matrix M is thus the identity matrix;

$2^{nd}$ case) EVEN is received, COMB1 is received. Rem (SN1)=0 and Rem(SN2)=1, the matrix M is the invert of $$\begin{pmatrix} 1 & 0 \\ \alpha_{1,1} & \alpha_{1,2} \end{pmatrix},$$

that is $$\begin{pmatrix} 1 & 0 \\ \alpha_{1,1}/\alpha_{1,2} & 1/\alpha_{1,2} \end{pmatrix},$$

$\alpha_{1,1}$ and $\alpha_{1,2}$ being the coefficients used by the encoding engine 303 of the transmitter, as described in FIG. 3;

$3^{rd}$ case) EVEN is received, COMB2 is received. Rem (SN1)=0 and Rem(SN2)=2, the matrix M is the invert of $$\begin{pmatrix} 1 & 0 \\ \alpha_{2,1} & \alpha_{2,2} \end{pmatrix}$$

that is $$\begin{pmatrix} 1 & 0 \\ \alpha_{2,1}/\alpha_{2,2} & 1/\alpha_{2,2} \end{pmatrix},$$

$\alpha_{2,1}$ and $\alpha_{2,2}$ being the coefficients used by the encoding engine 303;

4th case) ODD is received, COMB1 is received. Rem (SN1)=1 and Rem(SN2)=3, the matrix M is the invert of $$\begin{pmatrix} \alpha_{1,1} & \alpha_{1,2} \\ 0 & 1 \end{pmatrix}$$

that is $$\begin{pmatrix} 1/\alpha_{1,1} & \alpha_{1,2}/\alpha_{1,1} \\ 0 & 1 \end{pmatrix},$$

$\alpha_{1,1}$ and $\alpha_{1,2}$ being the coefficients used by the encoding engine 303;

5th case) ODD is received, COMB2 is received. Rem (SN1)=2 and Rem(SN2)=3, the matrix M is the invert of $$\begin{pmatrix} \alpha_{2,1} & \alpha_{2,2} \\ 0 & 1 \end{pmatrix}$$

that is $$\begin{pmatrix} 1/\alpha_{2,1} & \alpha_{2,2}/\alpha_{21} \\ 0 & 1 \end{pmatrix},$$

$\alpha_{2,1}$ and $\alpha_{2,2}$ being the coefficients used by the encoding engine 303;

6th case) COMB1 is received, COMB2 is received. Rem (SN1)=1 and Rem(SN2)=2, the matrix M is the invert of $$\begin{pmatrix} \alpha_{1,1} & \alpha_{1,2} \\ \alpha_{2,1} & \alpha_{2,2} \end{pmatrix}$$

that is $$\frac{1}{\alpha_{1,1}\alpha_{2,2}+\alpha_{2,1}\alpha_{1,2}}\begin{pmatrix} \alpha_{2,2} & \alpha_{1,2} \\ \alpha_{2,1} & \alpha_{1,1} \end{pmatrix},$$

$\alpha_{1,1}$, $\alpha_{1,2}$, $\alpha_{2,1}$ and $\alpha_{2,2}$ being the coefficients used by the encoding engine 303.

Though the probability of the following event is very low, it may happen that only one out of the 4 possible encoded PDUs is received. In such case, the process will not retrieve the original PDU which is lost (or a retransmission could be requested).

The matrices are given as a preferred choice as the decoding complexity is reduced thanks to the use of coefficients belonging to the set {0,1}. However, any choice of 4 pairs of linearly independent vectors would be acceptable. The matrix operations are performed by "multiply and add" units 404 and 405. The results are stored in buffers 406 and 407 before being appended by the module 408 to reconstruct the original PDU. Extra-padding may be removed in module 409. Finally, module 410 removes the duplicated PDUs, as it may happen that more than 2 encoded PDUs sharing the same quotient are received.

Figure 5:
FIG. 5 illustrates a block diagram illustrating a downlink or uplink transmission with carrier aggregation.

FIG. 5 illustrates a block diagram illustrating the protocol stack used in a downlink or uplink transmission with carrier aggregation.

Wireless communication systems may be packet oriented networks that operate using layers of protocols, stacked one upon another. In our case, the protocols for exchanging control packets and data packets are independent, meaning that there is a control plane independent of a user data plane. Both planes use identical layers, but the stacks differ. The user data plane may be made of a SDAP layer, a PDCP Layer, an RLC Layer, a MAC Layer. The control data plane may be made of an RRC layer, a PDCP Layer, an RLC Layer, a MAC Layer. The FIG. 5 represents the protocol stack taking care of a user data packet. The stack is made of, on the transmitter side 510, a SDAP layer 511, a PDCP layer 512, RLC layers 513 and 514, a MAC layer 515, and a PHY layer 516. On the receiver side 520, one finds the same stack that handles the incoming data packets, in the reverse order. First the PHY layer 526, then the MAC Layer 525, the RLC layers 523 and 524, the PCDP Layer 522, and finally the SDAP layer 521. The PHY layer at transmitter side 516 provides an electrical interface to the transmission medium (the air) by converting the stream of information into physical modulation signals, modulating a carrier frequency and, on the receiver side 526, does the reverse, providing an interface from the medium to electrical signals by demodulation and frequency down shifting. The PHY layer is described in TS38.201, TS38.211, TS38.212, TS38.213, TS38.214.

The MAC (Media Access Channel) 516 protocol is responsible for selecting available transmission formats for the user data and for the mapping of logical channels to the transport channels. The MAC handles also a part of the Hybrid Automated Repetition request scheme. The MAC layer is described in TS38.321. The MAC encapsulates the data packets issued from the RLC layers 513 and 514. It adds a header carrying information necessary to the MAC function.

The MAC on the receiver side 525 receives data from the PHY layer 526 and removes the MAC header. It passes the data to the RLC layers.

The RLC (Radio Link Control) layer 513 or 514 is responsible for the segmentation of user data packets issued from the PDCP layer in order to make them suitable for the transport format selected by the MAC. It may add a header carrying information necessary to the RLC function. It is also responsible for requesting retransmissions of missing packets, if a mode different from the transparent mode is selected. It has to be noted that these requests are made through ACK/NACK signalling and Buffer Status Request (BSR) sent backward. ACK/NACK indicates which packets were received or not received, Buffer Status in answer to the BSR indicates which packets are still to be successfully sent and received. The RLC layer is described in TS38.322. There are as many RLC layer instantiations as there are carrier frequencies (also referred as component carriers). In Carrier Aggregation, RLC layers pass or receive their egress/ingress packets to only one MAC entity.

The RLC layers on the receiver side 523 and 524 receive data from the MAC layer. An RLC layer manages the ACK/NACK packets necessary to create a retransmission. The carrier frequencies could present different quality of transmissions due to different propagations, hence the necessity to have a plurality of RLCs as the modulation and retransmission may differ. The RLC at receiver side also handles the segmentation and recreates PDCP PDUs before passing them to the PDCP layer.

The Packet Data Convergence Protocol (PDCP) layer 512 (Tx)/522 (Rx) handles IP Header compression/decompression, ciphering/deciphering and integrity of the user data packets while a control packet passes by, but mandatorily numbers the packets on the emitter side, and reorders the received packets on the receiver side. The PDCP layer is described in TS38.323. The PDCP encapsulates (when placed on the transmission path)/de-encapsulates (when placed on the reception path) the user data packets issued from or sent to the above SDAP layer, or the control packets issued from the RRC layer. It adds/removes a header carrying information necessary to the PDCP function, which comprises a sequence number, a control/data identification bit, and a PDU type information when the control bit is set. The PDCP may pass or receive its egress/ingress packets to a multiplicity of RLC entities in multi-connectivity modes (Carrier Aggregation/Multi Connectivity with up to four legs).

A SDAP (Service Data Adaptation Protocol) layer 511 or 521 handles the Quality of Service. The SDAP layer is described in TS38.324. This layer exists only in the User Data Plane of 5G NR. The QoS in the 5G NR is flow-based. Packets are classified and marked with a QoS Flow Identifier (QFI). The 5G QoS flows are mapped in the RAN to Data Radio Bearers (DRBs). In 5G NR, a Radio Bearer, or Data Radio Bearer, corresponds to the use of resources implementing the protocols (PDCP, RLC, MAC) and the PHY layer. A Data Radio Bearer may carry several data flows if they belong to the same class of QoS. The role of the SDAP layer is to attribute a radio bearer to one or many QoS flows.

In Carrier Aggregation, the user data are transmitted upon 2 or more Component Carriers, here represented by 540 and 541. Component Carriers have different frequencies, and may have different bandwidths, different propagations, resulting into different throughputs. As said above, managing these differences requires several RLC layers. However, the same MAC layer handles the transmission flow.

Figure 6:
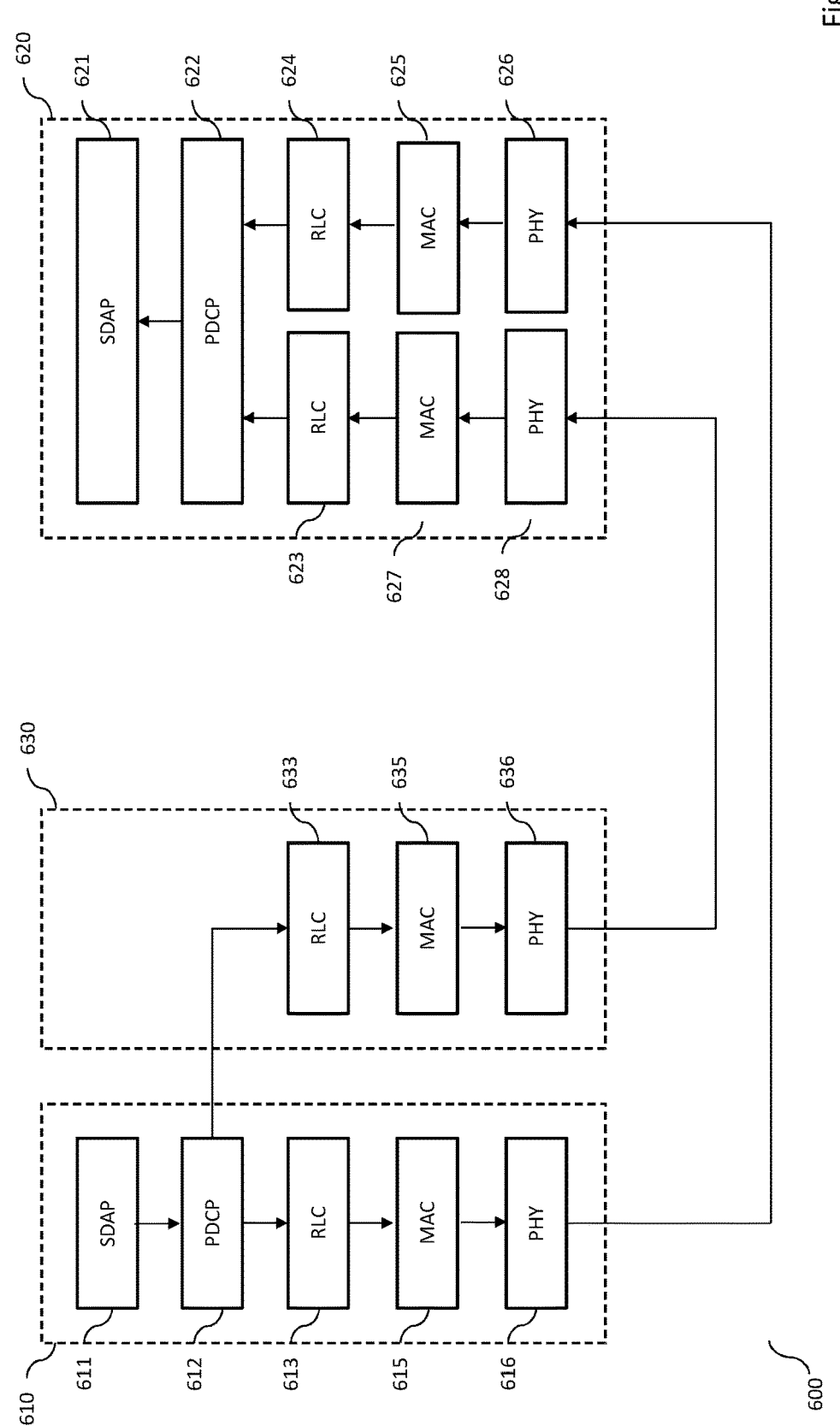
FIG. 6 illustrates a block diagram illustrating a downlink transmission with dual-connectivity.

FIG. 6 illustrates a block diagram illustrating the protocol stack for downlink transmissions with dual-connectivity.

A first base station 610 (Master) operates a first protocol stack in transmission comprising a SDAP layer 611, a PDCP layer 613, an RLC layer 613, a MAC layer 615 and a PHY layer 616. This base station may belong to a 4G/LTE network or a 5G NR network. A second base station 630 (Secondary), belonging to a 5G NR network, comprises an RLC layer 633, a MAC layer 635 and a PHY layer 636. The RLC layers 613 and 633 get their PDUs from the same PDCP layer 613, forming what is called a split bearer.

In the UE 620, handling the received packets requires a duplication of some functions, and hence 2 independent partial stacks are used. A first partial stack comprises the PHY layer 628, the MAC layer 627 and the RLC layer 623. A second partial stack comprises the PHY layer 626, the MAC layer 625 and the RLC layer 624. The 2 RLC layers 623 and 624 pass their PDUs to the same PDCP layer 622. This PDCP layer 622 will be responsible for removing the duplicated packets prior to pass them to the SDAP layer 621.

In case more than two legs are used (multi-connectivity mode), there are as many partial stacks (PHY, MAC, RLC) as the number of legs.

Figure 7:
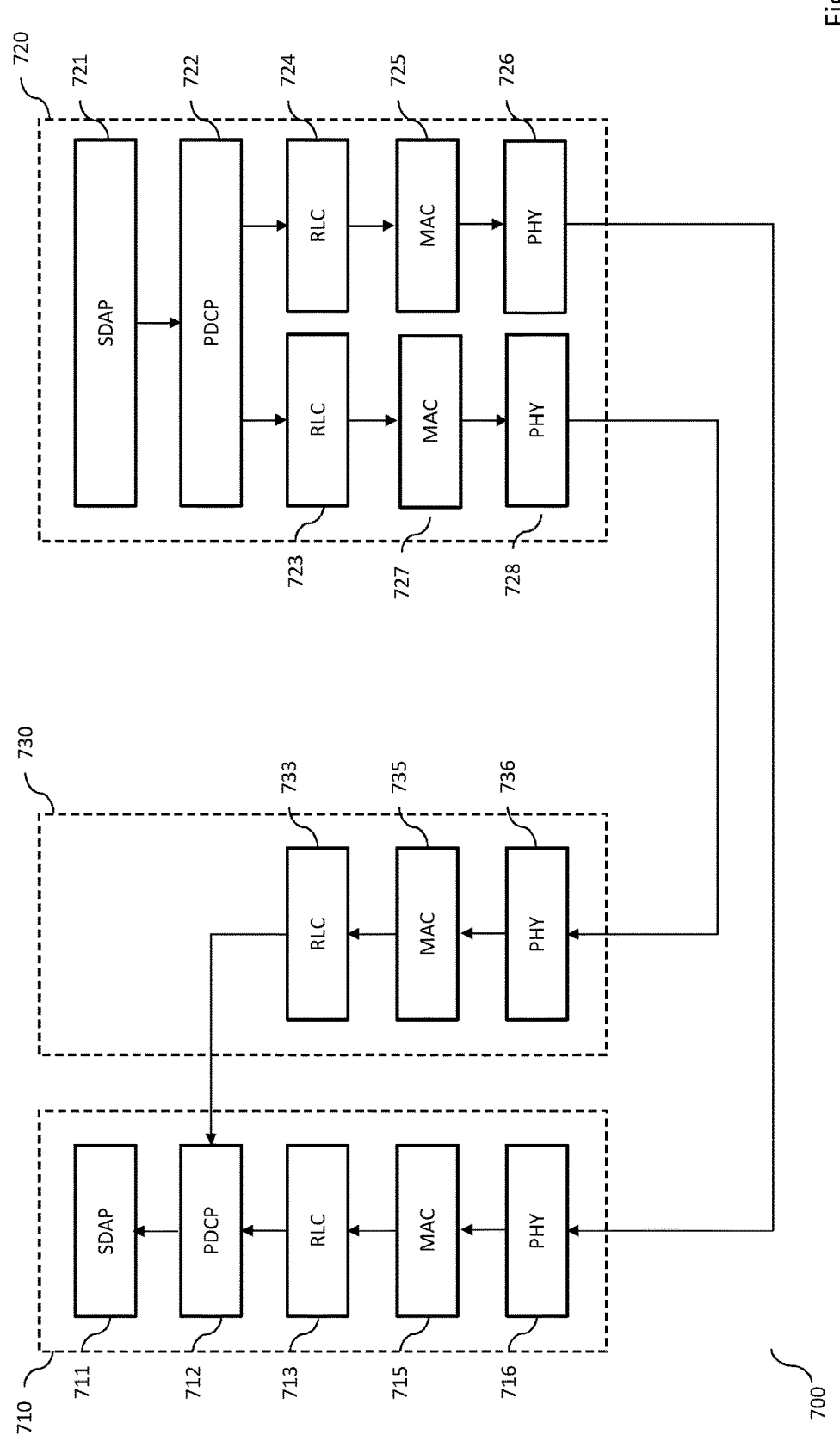
FIG. 7 illustrates a block diagram illustrating an uplink transmission with dual-connectivity.

FIG. 7 illustrates a block diagram illustrating the protocol stack for uplink transmissions with dual-connectivity.

A first base station 710 operates a first protocol stack in reception comprising a SDAP layer 711, a PDCP layer 712, an RLC layer 713, a MAC layer 715 and a PHY layer 716. This base station may belong to a 4G/LTE network or a 5G NR network. A second base station 730, belonging to a 5G NR network, comprises an RLC layer 733, a MAC layer 735 and a PHY layer 736. The RLC layers 713 and 733 send their PDUs to the same PDCP layer 712. This PDCP layer 712 will be responsible for removing the duplicated packets prior to pass them to the SDAP layer 711.

In the UE 720, handling the packets to transmit requires a duplication of some functions, and hence 2 independent partial stacks are used. A first partial stack comprises the PHY layer 728, the MAC layer 727 and the RLC layer 723. A second partial stack comprises the PHY layer 726, the MAC layer 725 and the RLC layer 724. The 2 RLC layers 723 and 724 receive their PDUs from the same PDCP layer 722, forming what is called a split bearer.

In case more than two legs are used (multi-connectivity mode), there are as many partial stacks (PHY, MAC, RLC) as the number of legs.

Figure 8:
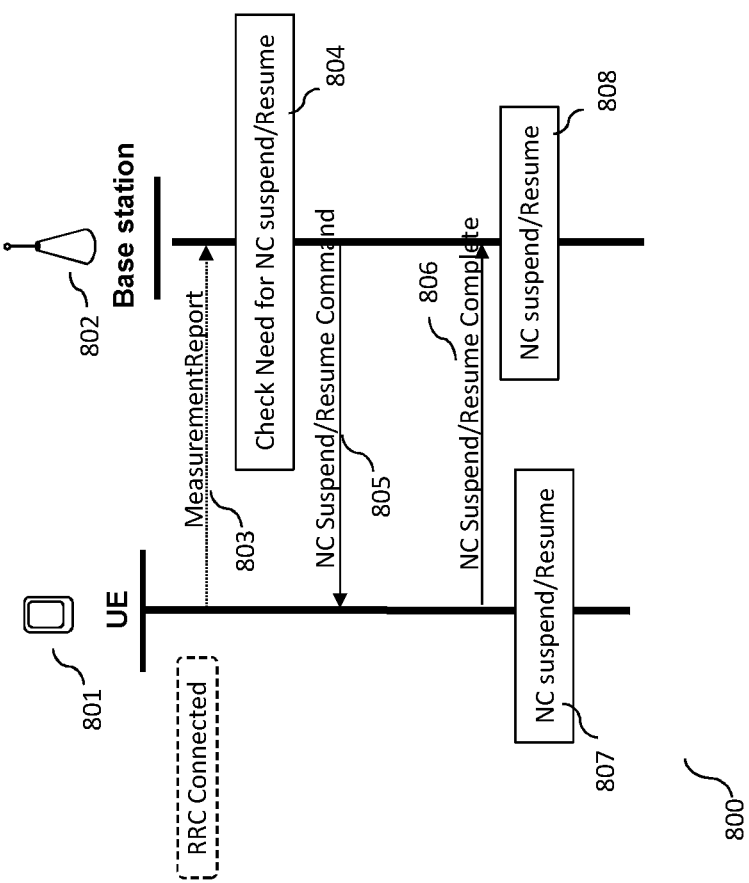
FIG. 8 illustrates an example of process flow that supports the NC suspend and resume process according to one embodiment of the invention.

FIG. 8 illustrates an example of process flow 800 that supports the NC suspend and resume process according to one embodiment of the invention. Suspension of the network coding corresponds to a deactivation of the network coding, while resumption of the network coding corresponds to an activation of the network coding. It assumes that UE 801 is in RRC connected state as defined in TS 38.331, meaning that UE 801 is connected to a base station 802 (which is a gNB in a 5G NR network).

UE 801 is also registered at core network entity (e.g. the 5G Core) not represented.

According to one embodiment of the invention, UE 801 refers to UE 101 of FIG. 1 or UE 201 of FIG. 2, and base station 802 refers to base station 102 of FIG. 1 or base station 202-a or 202-b of FIG. 2.

The Base Station 802 checks the need for a Network Coding suspend or a Network Coding Resume, depending on the previous state. The suspension or the resumption may be provoked by a change in the quality of the channel, indicated by a measurement report 803, or by a change in the load of the Base Station. The Base Station checks the need for modifying the NC usage 804. An improvement of the channel quality may be an indication for a network coding suspension, while a deterioration may indicate the need for resuming network coding.

The Base Station then prepares a NC Suspend/Resume Command message 805 that contains the indication of suspension or resumption of the network coding operation.

Upon reception of the message, the UE sends a message NC Suspend/Resume Complete 806 to the Base Station and suspends, resp. resumes, the Network Coding operation at 807. Similarly, upon reception of the message 806, the Base Station suspends, resp. resumes, the Network Coding Operations at 807.

An example of the NC Suspend/Resume Command message 805 may be the RRCReconfiguration message, described in TS 38.331 (version 16.0.0), modified to carry the Network Coding parameters. The modifications are presented below.

Figure 13:
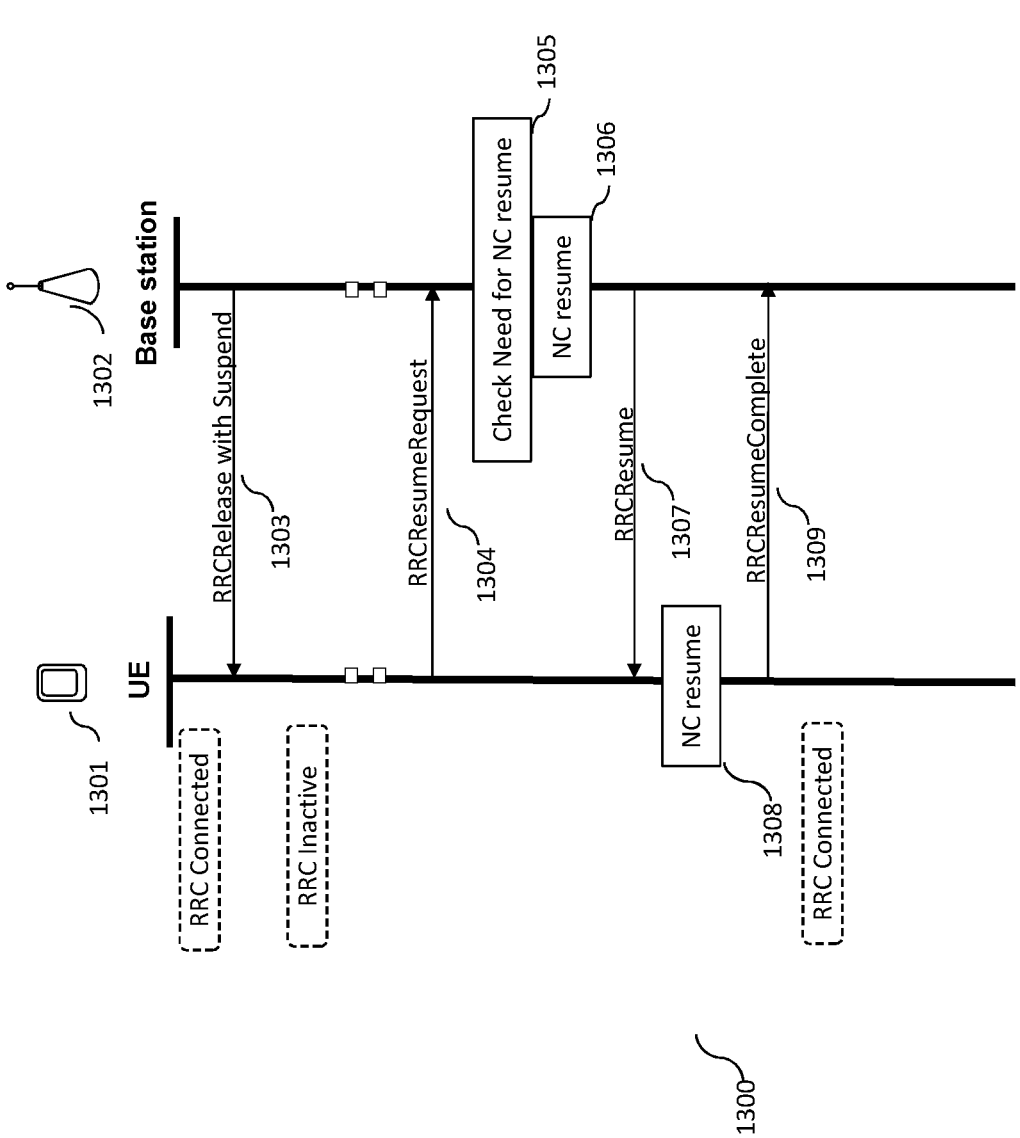
FIG. 13 illustrates an example of process flow that supports the NC suspend and resume process according to another embodiment of the invention.

Following is an illustration of NC configuration information, in relation with messages 805 of FIG. 8, and 1307 of FIG. 13. The NC activation and configuration information (in bold below) may be added in the information element called RadioBearerConfig carried in the RRC messages RRCReconfiguration and RRCResume. As defined in TS 38.331 (version 16.0.0).

```
RadioBearerConfig ::=                    SEQUENCE {
    srb-ToAddModList                         SRB-ToAddModList            OPTIONAL,
    srb3-ToRelease                           ENUMERATED{true}            OPTIONAL,
    drb-ToAddModList                         DRB-ToAddModList            OPTIONAL,
    drb-ToReleaseList                        DRB-ToReleaseList           OPTIONAL,
    securityConfig                           SecurityConfig              OPTIONAL,
    ...
}
DRB-ToAddModList ::=                     SEQUENCE (SIZE (1..maxDRB)) OF DRB-ToAddMod
DRB-ToAddMod ::=                         SEQUENCE {
    cnAssociation                            CHOICE {
        eps-BearerIdentity                       INTEGER (0..15),
        sdap-Config                              SDAP-Config
    }                                                                    OPTIONAL,
    drb-Identity                             DRB-Identity,
    reestablishPDCP                          ENUMERATED{true}            OPTIONAL,
    recoverPDCP                              ENUMERATED{true}            OPTIONAL,
    pdcp-Config                              PDCP-Config                 OPTIONAL,
    ...,
    [[
    dapsConfig-r16                           ENUMERATED{true}            OPTIONAL
    ]]
}
    PDCP-Config ::=                      SEQUENCE {
        drb                                  SEQUENCE {
            discardTimer                         ENUMERATED {ms10, ms20, ms30, ms40, ms 50,
                                                     ms60, ms75, ms100, ms150, ms200,
                                                     ms250,ms300, ms500, ms750, ms1500,
                                                     infinity}               OPTIONAL,
                pdcp-SN-SizeUL               ENUMERATED {len12bits, len18bits}   OPTIONAL,
                pdcp-SN-SizeDL               ENUMERATED {len12bits, len18bits}   OPTIONAL,
                headerCompression            CHOICE {
                    notUsed                      NULL,
                    rohc                         SEQUENCE {
                        maxCID                       INTEGER (1..16383)         DEFAULT 15,
                        profiles                     SEQUENCE {
                            profile0x0001                BOOLEAN,
                            profile0x0002                BOOLEAN,
                            profile0x0003                BOOLEAN,
                            profile0x0004                BOOLEAN,
                            profile0x0006                BOOLEAN,
                            profile0x0101                BOOLEAN,
                            profile0x0102                BOOLEAN,
                            profile0x0103                BOOLEAN,
                            profile0x0104                BOOLEAN
                        },
                        drb-ContinueROHC             ENUMERATED { true }        OPTIONAL
                    },
                    uplinkOnlyROHC               SEQUENCE {
                        maxCID                       INTEGER (1..16383)         DEFAULT 15,
                        profiles                     SEQUENCE {
                            profile0x0006                BOOLEAN
                        },
                        drb-ContinueROHC             ENUMERATED { true }        OPTIONAL
                    },
                    ...
                },
                integrityProtection          ENUMERATED { enabled }         OPTIONAL,
                statusReportRequired         ENUMERATED { true }            OPTIONAL,
                outOfOrderDelivery           ENUMERATED { true }            OPTIONAL
            }                                                                   OPTIONAL,
            nc-Activation                BOOLEAN                        OPTIONAL,
            nc-Suspension                BOOLEAN                        OPTIONAL,
            nc-Config                    SEQUENCE {                     OPTIONAL,
                nc-Mode                      ENUMERATED {ca, mc},
                nc-NumChannel                INTEGER (1..8),
                nc-Scheme                    ENUMERATED {sch1, sch2, sch3, sch4, sch5, sch6},
                nc-CoeffList                 SEQUENCE ((SIZE (1..32)) OF nc-CoeffValue,
                nc-CoeffValue                BIT STRING (SIZE (8)),
                nc-CoeffMapping              SEQUENCE {
                    nc-Channel1                  BIT STRING (SIZE (8)),
                    nc-Channel2                  BIT STRING (SIZE (8)),
                ...
            }
```

In this example, the NC activation, suspension and configuration information parameters are composed of:

nc-Activation: a boolean to indicate if NC shall be activated or not;

nc-Suspension: a boolean to indicate if NC shall be deactivated or not;

nc-Config gathering the following NC parameters:

nc-Mode: a value out of a plurality of possible values indicating the transmission mode (Carrier Aggregation or Multi-Connectivity);

nc-NumChannel: an integer number indicating the number of RLC channel used for NC;

nc-Scheme: a value out of a plurality of possible values indicating the NC scheme to apply. This format assumes that both base station and UE are sharing the same understanding of which NC scheme corresponds to each possible value. In particular, the NC scheme may identify the number of PDUs to be combined together in each linear combination;

nc-CoeffList: a list of coefficient values nc-CoeffValue (for instance 8 bits each in a Galois Field 256). The maximum number of coefficients is a constant (for instance 32). As example, assuming that no more than 4 different PDUs can be combined together in the various NC schemes, then the first linear combination uses coefficients belonging to the first set (coefficients from 1 up to 4), the second linear combination uses coefficients belonging to the second set (coefficients from 5 up to 8), etc. . . . ;

nc-CoeffMapping: a list of RLC channel classified in increasing order of the logical channel identity. The number of elements of this list is indicated by the parameter nc-NUMChannel. The value is a bit string where each bit (Boolean) is associated to one linear combination (i.e. to one set of coefficients). If the value is true, the linear combination is transmitted over this channel.

This is a non-limitative example, other formats and combinations of parameters are possible.

An example of the NC Suspend/Resume Complete message 806 may be the RRCReconfigurationComplete message, described in TS 38.331 (version 16.0.0).

Figure 14:
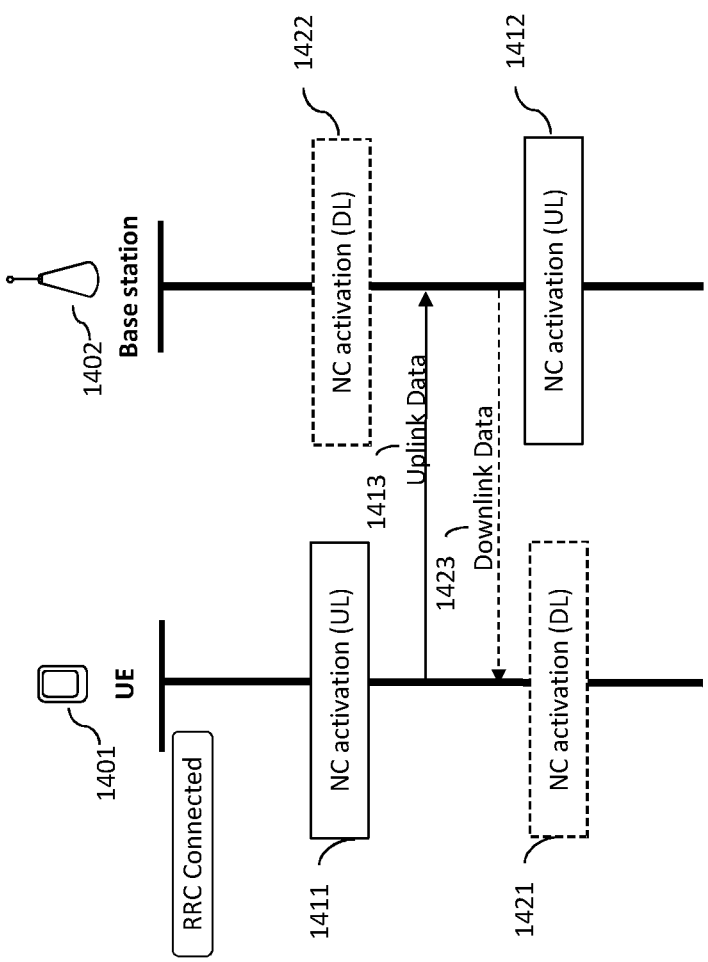
FIG. 14 illustrates an example of process flow that supports the synchronization of NC resuming according to one embodiment of the invention.
Figure 15:
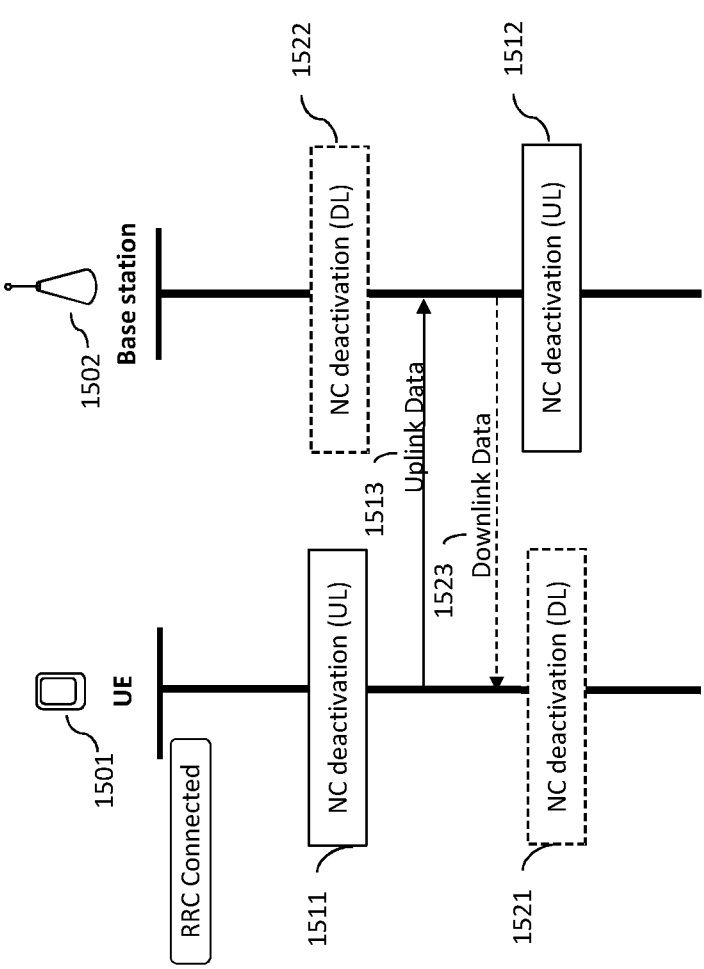
FIG. 15 illustrates an example of process flow that supports the synchronization of NC suspension according to one embodiment of the invention.

As indicated by the TS 38.331 it may happen that some data packets are in the buffers waiting to be sent. They are inconsistent with state that the command has created. The TS38.331 indicates these packets must be flushed. Retransmission mechanisms may lead to the retransmission of these packets according to the newly adapted scheme. In one embodiment of the invention, the method of FIGS. 14 and 15 is applied, which does not require flushing the data packet.

The information carried by NC suspend/resume command and the NC suspend/Resume complete may be global (to be applied to all existing DRBs between base station and UE) or per DRB.

Figure 9:
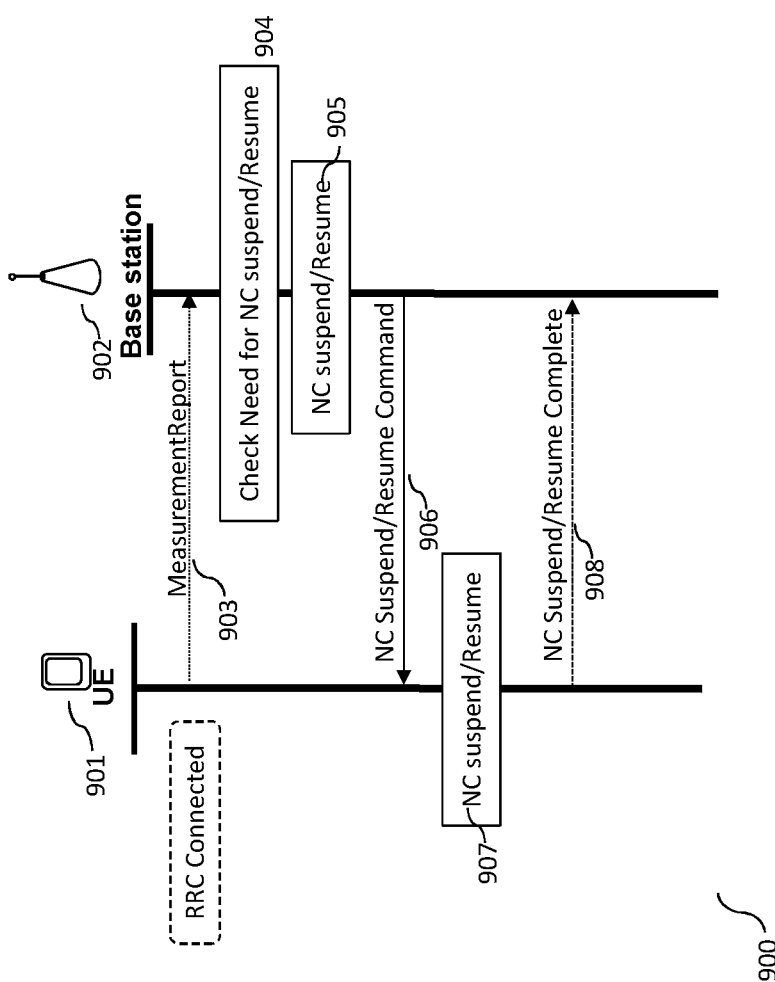
FIG. 9 illustrates an example of process flow that supports the NC suspend and resume process according to another embodiment of the invention.

FIG. 9 illustrates an example of process flow 900 that supports the NC suspend and resume process according to another embodiment of the invention. It assumes that UE 901 is in RRC connected state as defined in TS 38.331, meaning that UE 901 is connected to a base station 902 (which is a gNB in a 5G NR network). UE 901 is also registered at core network entity (e.g. the 5G Core) not represented.

According to one embodiment of the invention, UE 901 refers to UE 101 of FIG. 1 or UE 201 of FIG. 2, and base station 902 refers to base station 102 of FIG. 1 or base station 202-*a* or 202-*b* of FIG. 2.

The Base Station 902 checks the need for suspending or resuming a Network Coding (step 904). The suspension or the resumption may be provoked by a change in the quality of the channel, indicated by a measurement report 903, or by a change in the load of the Base Station. An improvement of the channel quality may be an indication for a network coding suspension, while a deterioration may indicate the need for resuming Network Coding.

Once having decided to suspend or resume the Network Coding operation 905, the Base Station then prepares and sends a NC Suspend/Resume Command message 906 that contains the indication of suspension or resuming of the network coding operation. Upon reception of the message, the UE suspends or resumes the Network Coding operation 907.

In one embodiment of the invention, UE 901 sends a message NC Suspend/Resume Complete 908 to the Base Station. In another embodiment of the invention, UE 901 does not send a message NC Suspend/Resume Complete 908 to the Base Station.

According to one embodiment of the invention, the NC-Suspend/Resume Command message 906 may be carried by a MAC Control Element, and the NC-Suspend/Resume Complete message 908 may be carried by another MAC Control Element. Further details on the format of this MAC CE elements are provided in FIG. 35. These MAC CE elements may be identical or different in format. They may carry the information for any Data Radio Bearer (DRB), for uplink and/or downlink, and/or for several DRBs at the same time.

In one embodiment of the invention, at base station level, the activation, resp. deactivation, of the Network Coding resulting from the decision to resume, resp. suspend, the network coding operation at step 905 may take effect at step 905, prior to sending the NC-Suspend/Resume Command message 906.

In another embodiment of the invention, at base station level, the activation, resp. deactivation, of the Network Coding resulting from the decision to resume, resp. suspend, the network coding operation at step 905 may take effect after the reception of a NC Suspend/Resume Complete message 908.

In one embodiment of the invention, at UE level, the activation, resp. deactivation, of the Network Coding resulting from the decision to resume, resp. suspend, the network coding operation at step 907 may take effect at step 907, prior to sending the NC-Suspend/Resume Complete message 908.

In another embodiment of the invention, at base station level, the activation, resp. deactivation, of the Network Coding resulting from the decision to resume, resp. suspend, the network coding operation at step 905 may take effect after the transmission of the NC-Suspend/Resume Complete message 908.

The information carried by the NC suspend/resume command 906 and the NC suspend/Resume complete 908 may be global (to be applied to all existing DRBs between base station and UE), or per DRB.

Figure 10:
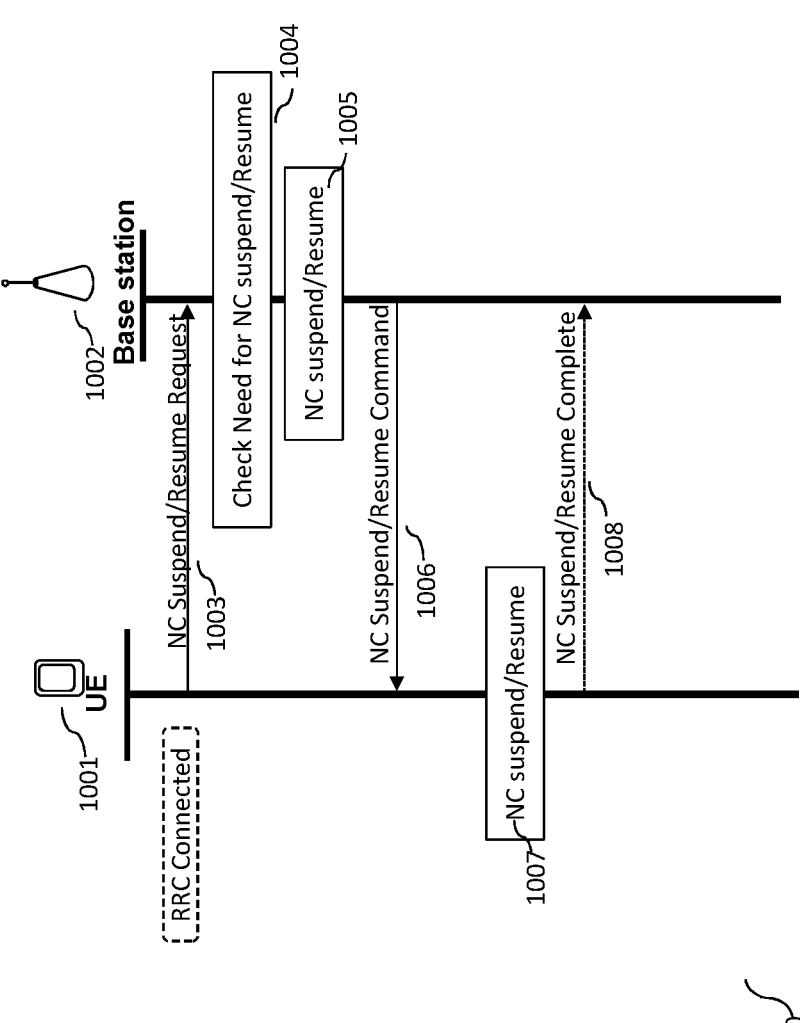
FIG. 10 illustrates an example of process flow that supports the NC suspend and resume process according to a third embodiment of the invention.

FIG. 10 illustrates an example of process flow 1000 that supports the NC suspend and resume process according to a third embodiment of the invention. It assumes that UE 1001 is in RRC connected state as defined in TS 38.331, meaning that UE 1001 is connected to a base station 1002 (which is a gNB in a 5G NR network). UE 1001 is also registered at core network entity (e.g. the 5G Core) not represented.

According to one embodiment of the invention, UE 1001 refers to UE 101 of FIG. 1 or UE 201 of FIG. 2, and base station 1002 refers to base station 102 of FIG. 1 or base station 202-*a* or 202-*b* of FIG. 2.

The UE 1001 sends a NC Suspend/Resume Request message 1003 to the Base Station 1002. In one embodiment of the invention, the decision by the UE to transmit a NC Suspend/Resume Request message 1003 may be provoked by the load of the UE. According to one embodiment of the invention, the NC Suspend/Resume Request message 1003 may be carried by a MAC Control Element. Further details on the format of this MAC CE elements are provided in FIG. 35.

According to another embodiment of the invention, the NC Suspend/Resume Request message 1003 may be carried by a RRC message, as described in FIG. 8.

According to another embodiment of the invention, having nc-Suspension equal to '1' stands for a NC suspend request while having nc-Suspension equal to '0' stands for a NC resume request.

According to another embodiment of the invention, having nc-Activation equal to '1' stands for a NC resume request while having nc-Activation equal to '0' stands for a NC suspend request.

Upon reception of a NC Suspend/Resume Request message 1003, the Base Station 1002 checks the need for a Network Coding suspend or resume at step 1004. For instance, the Base Station may consider the request is not necessary, in view of the scheduler queue, or other parameters which are not accessible to the UE.

Once having decided to suspend or resume the Network Coding operation 1005, the Base Station then prepares and sends a NC Suspend/Resume Command message 1006 that contains the indication of suspension or resuming of the network coding mode. Upon reception of the message 1006, the UE suspends or resumes the Network Coding operation at step 1007.

In one embodiment of the invention, UE 1001 sends a message NC Suspend/Resume Complete 1008 to the Base Station. In another embodiment of the invention, UE 1001 does not send a message NC Suspend/Resume Complete 1008 to the Base Station.

According to one embodiment of the invention, the NC-Suspend/Resume Command message 1006 may be carried by a MAC Control Element, and the NC-Suspend/Resume Complete message 1008 may be carried by another MAC Control Element. These MAC CE elements may be identical or different in format, as described in FIG. 35. They may carry the information for uplink, downlink or both.

In one embodiment of the invention, at base station level, the activation, resp. deactivation, of the Network Coding resulting from the decision to resume, resp. suspend, the network coding operation at step 1005 may take effect at step 1005, prior to sending the NC-Suspend/Resume Command message 1006.

In another embodiment of the invention, at base station level, the activation, resp. deactivation, of the Network Coding resulting from the decision to resume, resp. suspend, the network coding operation at step 1005 may take effect after the reception of a NC Suspend/Resume Complete message 1008.

In one embodiment of the invention, at UE level, the activation, resp. deactivation, of the Network Coding resulting from the decision to resume, resp. suspend, the network coding operation at step 1007 may take effect at step 1007, prior to sending the NC-Suspend/Resume Complete message 1008.

In another embodiment of the invention, at base station level, the activation, resp. deactivation, of the Network Coding resulting from the decision to resume, resp. suspend, the network coding operation at step 1005 may take effect after the transmission of the NC-Suspend/Resume Complete message 1008.

The information carried by the NC suspend/resume command 1006 and the NC suspend/Resume complete 1008 notifications may be global (to be applied to all existing DRBs between base station and UE), or per DRB.

Figure 11:
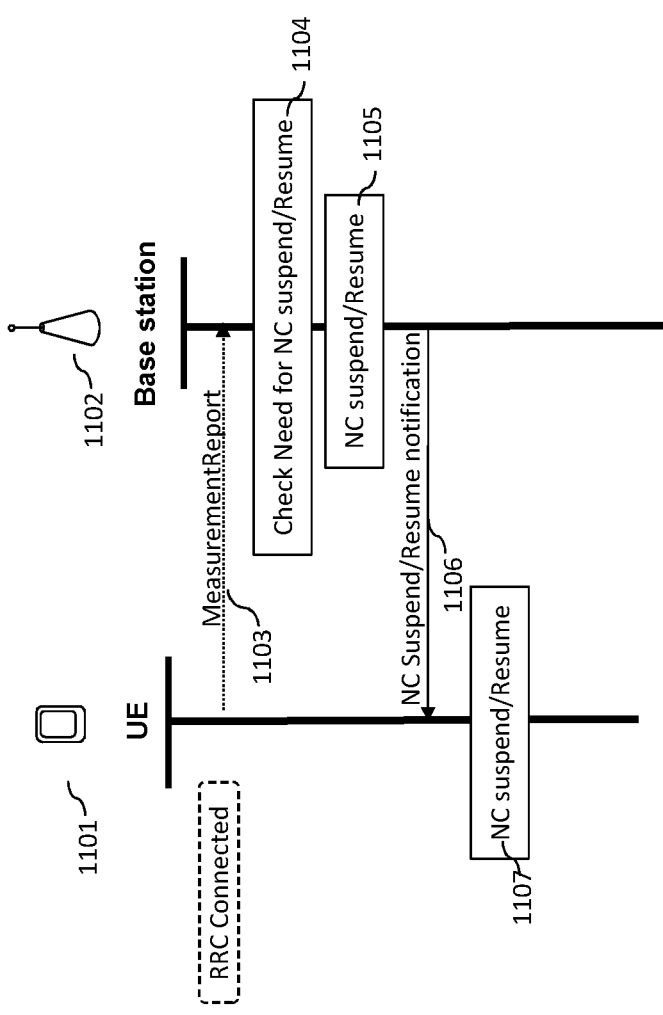
FIG. 11 illustrates an example of process flow that supports the NC suspend and resume process according to a fourth embodiment of the invention.

FIG. 11 illustrates an example of process flow 1100 that supports the NC suspend and resume process according to a fourth embodiment of the invention. It assumes that UE 1101 is in RRC connected state as defined in TS 38.331, meaning that UE 1101 is connected to a base station 1102 (which is a gNB in a 5G NR network).

According to one embodiment of the invention, UE 1101 refers to UE 101 of FIG. 1 or UE 201 of FIG. 2, and base station 1102 refers to base station 102 of FIG. 1 or base station 202-*a* or 202-*b* of FIG. 2.

UE 1101 is also registered at core network entity (e.g. the 5G Core) not represented. The Base Station 1102 checks the need for a Network Coding suspend or resume at step 1104. For instance, the suspension or the resumption may be provoked by a change in the quality of the channel, indicated by a measurement report 1103, or by a change in the load of the Base Station. Once decided to suspend or resume the Network Coding operation at step 1105, the Base Station then prepares and sends a NC Suspend/Resume notification 1106 that contains the indication of suspension or resuming of the network coding mode. Upon reception of the message, the UE suspends, resp. resumes, the Network Coding operation at step 1107.

In one embodiment of the invention, the NC-Suspend/Resume Notification may be carried by the PDCP header of one or more packets that are no longer NC encoded (in case of NC suspend) or by the PDCP header of one or more packets that that are NC encoded (in case of NC resume).

Figure 12:
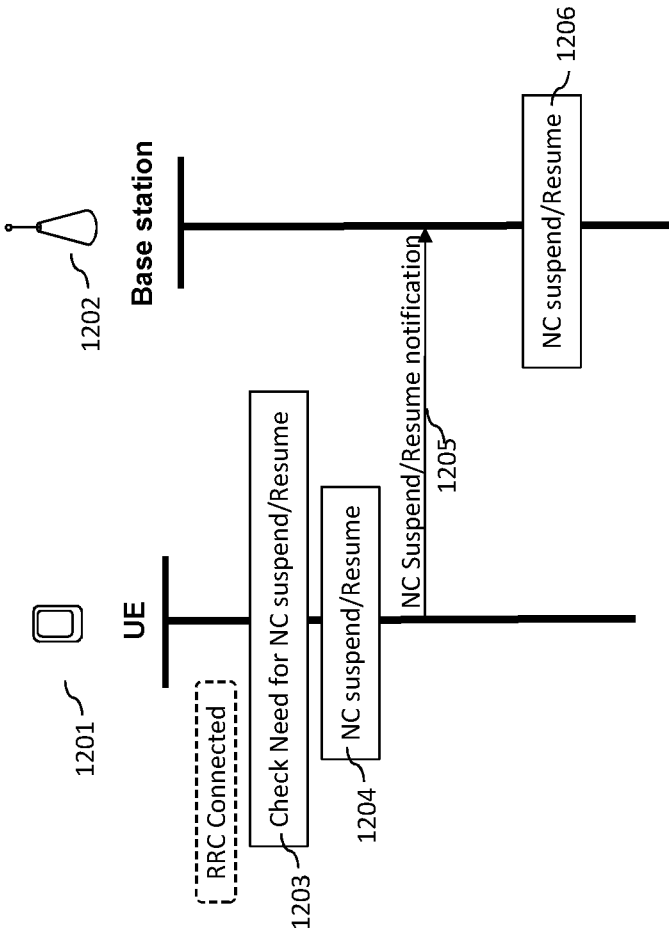
FIG. 12 illustrates an example of process flow that supports the NC suspend and resume process according to another embodiment of the invention.

FIG. 12 illustrates an example of process flow 1200 that supports the NC suspend and resume process according to another embodiment of the invention. It assumes that UE 1201 is in RRC connected state as defined in TS 38.331, meaning that UE 1201 is connected to a base station 1202 (which is a gNB in a 5G NR network). UE 1201 is also registered at core network entity (e.g. the 5G Core) not represented.

According to one embodiment of the invention, UE 1201 refers to UE 101 of FIG. 1 or UE 201 of FIG. 2, and base station 1202 refers to base station 102 of FIG. 1 or base station 202-*a* or 202-*b* of FIG. 2.

The UE checks continuously for the viability of a Network Coding scheme (step 1203) and may decide to suspend, resp. resume, the Network Coding accordingly (step 1204).

In one embodiment of the invention, the NC-Suspend/Resume Notification 1205 may be carried by the PDCP header of one or more packets that that are no longer NC encoded (in case of NC suspend) or by the PDCP header of one or more packets that that are NC encoded (in case of NC resume).

Upon reception of this notification the Base Station suspends, resp. resumes, its Network Coding Operation at step 1206.

FIG. 13 illustrates an example of process flow 1300 that supports the NC suspend and resume process according to another embodiment of the invention. It assumes that a UE 1301 is in RRC connected state as defined in TS 38.331, meaning that UE 1301 is connected to a base station 1302 which is a gNB in a 5G NR network in the context of this figure. It is also assumed that at least one uplink or downlink Data Radio Bearer (DRB) with an active NC scheme has been established between base station 1302 and UE 1301.

According to one embodiment of the invention, UE 1301 refers to UE 101 of FIG. 1 or UE 201 of FIG. 2, and base station 1302 refers to base station 102 of FIG. 1 or base station 202-*a* or 202-*b* of FIG. 2.

After a certain time period without activity for the UE 1301 (no transmission or reception of data), the base station 1302 may send to UE 1301 the RRC message 1303 called RRCRelease, with the suspend configuration as described in TS 38.331. The purpose is to reduce power consumption in UE 1301 and to save some radio bandwidth. Upon reception of this message 1303, the UE 1301 stores the current configuration and moves to the RRC state called RRC inactive. Base station 1302 also stores the current configuration.

At some point, base station 1302 may have new data to transmit to UE 1301, and the base station 1302 initiates the paging procedure to notify the UE (message not represented on the figure). Alternatively, UE 1301 may have new data to transmit and therefore it has to request base station 1302 to resume the connection. In both cases, UE 1301 sends the RRC message 1304 called RRCResumeRequest as defined in TS 38.331.

Upon reception of message 1304, the base station 1302 will resume the connection. At this occasion, base station 1302 may consider to resume Network Coding previously applied to the DRB for the data flow. For this purpose, the steps 1305 and 1306 are executed, they are identical to steps 805 and 806 in FIG. 8, meaning that the Base Station resumes the Network Coding operation by configuring its NC encoding engine (for a downlink transmission) or NC decoding engine (for an uplink transmission) to resume NC operations for the concerned DRB.

Then, the base station 1302 sends to UE 1301 the RRC message 1307 called RRCResume and defined in TS 38.331. This message may include a new configuration of the radio bearers. The RRCResume message 1307 is amended with an information element to resume NC. In particular, the NC activation information must be set to activation, as well as the NC resume information. Other parameters may be optional.

Upon reception of message 1307, the UE 1301 returns to the state RRC connected. Also, at step 1308, UE 1301 configures its NC encoding engine (for an uplink transmission) or NC decoding engine (for a downlink transmission) to resume NC operations for the concerned DRB, by first considering the NC parameters if they are present in the message RRCResume. If they are absent, the UE loads the last NC parameters it had stored going to suspend mode. In other words, in this particular case the UE disregards the state that it had stored previously for activation.

The notification of NC suspend/resume may be global (to be applied to all existing DRBs between base station and UE), or there may be one notification per DRB.

FIG. 14 illustrates an example of process flow 1400 that supports the synchronization of NC resuming according to one embodiment of the invention. The UE 1401 may be the UE 801, 901, 1001, 1101, 1201, 1301 after the execution of the process flows described in FIGS. 8, 9, 10, 11, 12, 13 respectively, for NC resume. The base station 1402 may be the base station 802, 902, 1002, 1102, 1202, 1302 after the execution of the process flows described in FIGS. 8, 9, 10, 11, 12, 13 respectively, for NC resume At the time of NC resuming for an existing radio bearer with data flow(s) already being transmitted, the data packets will become NC encoded packets. The receiver of these packets needs to understand when the packets actually become NC encoded. Despite the receiver knowing that NC will be applied, some packets which are not yet Network Code packets may still be received because they were already in the transmission queue of the transmitter at the time of decision to apply network coding. To synchronize the resuming of NC between the emitter and the receiver, an indication on whether the NC is actually applied or not in the current and subsequent packets is inserted in the header of one or more of the transmitted data packets.

In one embodiment of the invention, the indication is inserted in the headers handled by the layer performing the NC encoding and the NC decoding.

In one embodiment of the invention, the indication is embedded in the PDCP header of one or more data packets (1413 or 1423).

In another embodiment of the invention the indication is inserted into a MAC CE.

Hence for an uplink transmission, when the UE 1401 resumes NC in step 1411, it will start to encode the packets with the NC notification inserted in the headers or MAC CE. The uplink data packets 1413 are transmitted to the base station 1402 which parses the headers or the MAC CE. When a packet is identified as being a Network Code packet, the base station 1402 resumes the NC decoding operation in step 1412.

For a downlink transmission, when the base station 1402 resumes NC in step 1422, it will start to encode the packets with the NC notification inserted in the headers or in the MAC CE. The downlink data packets 1423 are transmitted to the UE 1401 which parses the headers or the MAC CE. When a packet is identified as being a Network Code packet, the UE 1401 resumes the NC decoding operation in step 1421.

FIG. 15 illustrates an example of process flow 1500 that supports the synchronization of NC suspension according to one embodiment of the invention. The UE 1501 may be the UE 801, 901, 1001, 1101, 1201, 1301 after the execution of the process flows described in FIGS. 8, 9, 10, 11, 12, 13 respectively, for NC suspend. The base station 1302 may be the base station 802, 902, 1002, 1102, 1202, 1302 after the execution of the process flows described in FIGS. 8, 9, 10, 11, 12, 13 respectively, for NC suspend.

At the time of NC suspend for an existing radio bearer with data flow(s) being transmitted, the data packets will no more be Network Code packets. The receiver of these packets needs to understand when the packets are no more Network Code packets. Despite, the receiver knows that NC will be stopped, some packets which are Network Code packets may still be received because there were already in the transmission queue of the transmitter at the time of decision to stop network coding. To synchronize the stop of NC between the emitter and the receiver, an indication that NC is applied or not is inserted in the headers of the transmitted packets.

In one embodiment of the invention, the indication is inserted in the headers handled by the layer performing the NC encoding and the NC decoding.

In one embodiment of the invention, the indication is embedded in the PDCP header of one or more data packets (1513 or 1523).

In another embodiment of the invention the indication is inserted into a MAC CE.

Hence for an uplink transmission, when the UE 1501 deactivates NC in step 1511, it will stop to encode the packets with the NC deactivation notification inserted in the headers or a suspend information in the MAC CE. The uplink data packets 1313 are transmitted to the base station 1502 which parses the headers or the MAC CE. When a packet is identified as not being a Network Code packet, the base station 1502 suspends the NC decoding operation in step 1312.

For a downlink transmission, when the base station 1502 suspends NC in step 1522, it will stop to encode the packets with NC deactivation notification inserted in the headers or in the MAC CE. The downlink data packets 1523 are transmitted to the UE 1501 which parses the headers or the MAC CE. When a packet is identified as not being a Network Code packet, the UE 1301 suspends the NC decoding operation in step 1521.

Figure 16:
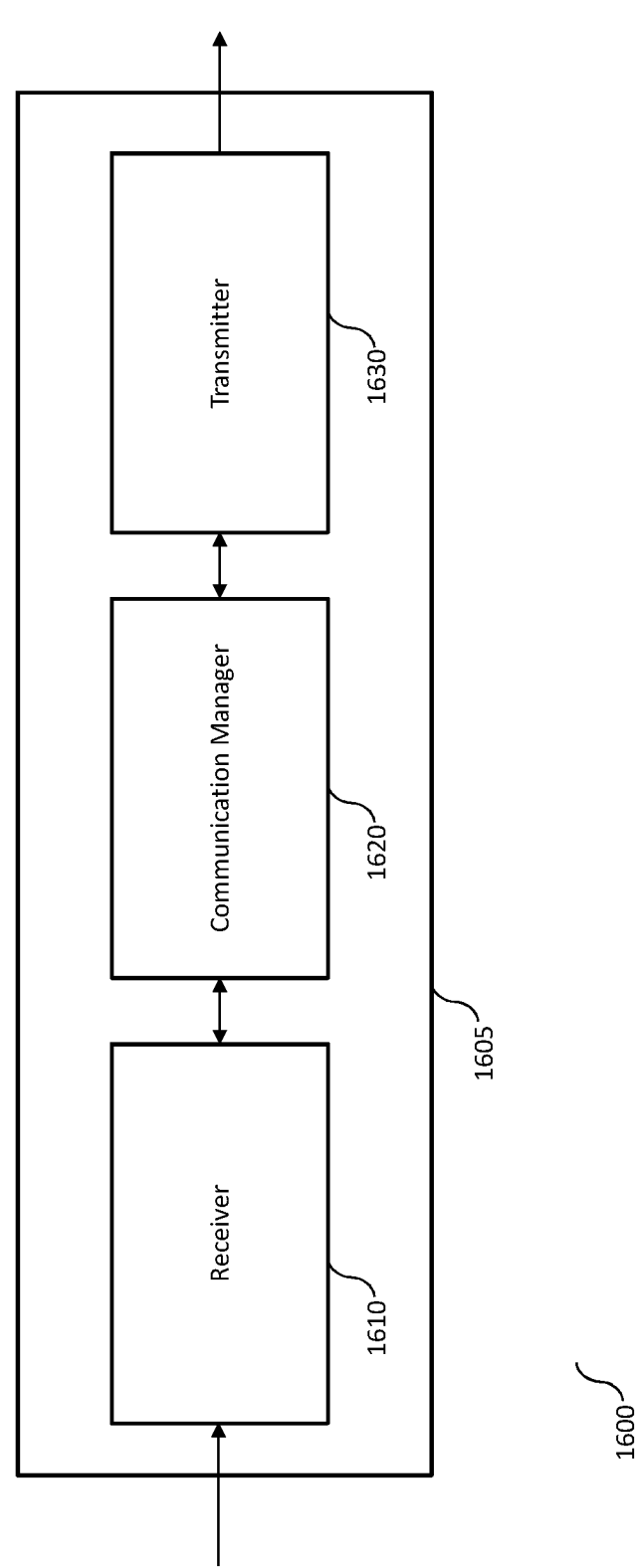
FIG. 16 illustrates a block diagram of a device that supports Network Coding according to the invention.

FIG. 16 illustrates a block diagram 1600 of a device 1605 that supports Network Coding according to the invention. Device 1605 may be an example of UE 101 or of base station 102 in relation with FIG. 1 or UE 201 or base station 202-*a* or 202*b* of FIG. 2. Device 1605 comprises a Receiver 1610, a Communication Manager 1620 and a Transmitter 1630. Each of these elements may be in communication with each other through one or more electronic buses.

The receiver 1610 receives both user plane and control plane packets, but may also receive synchronization signals. It may also receive specific signals for connection establishment purpose. Receiver 1610 may receive signals used for measurements or paging purpose.

Figure 18:
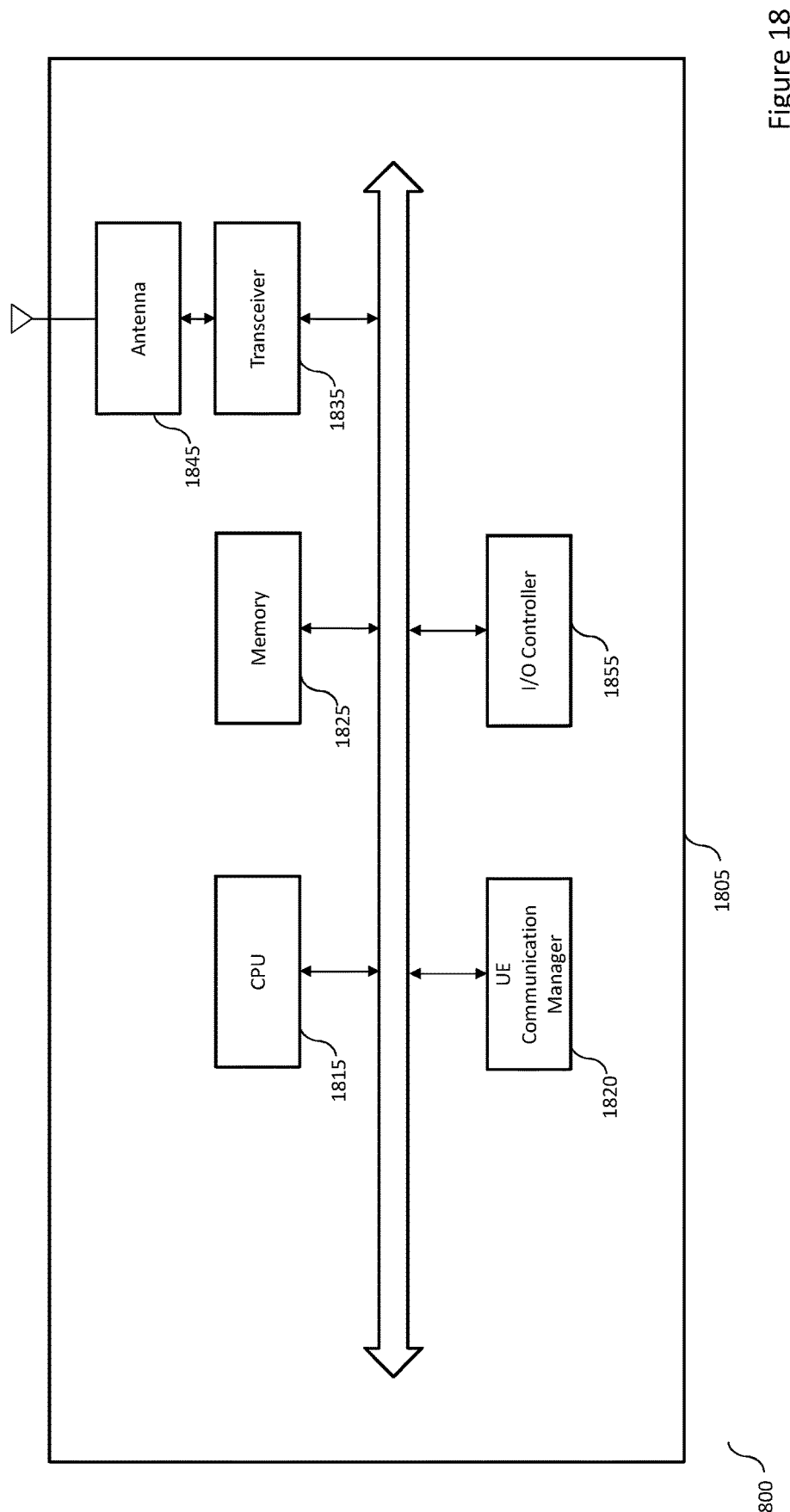
FIG. 18 illustrates a block diagram of a UE that supports Network Coding.
Figure 19:
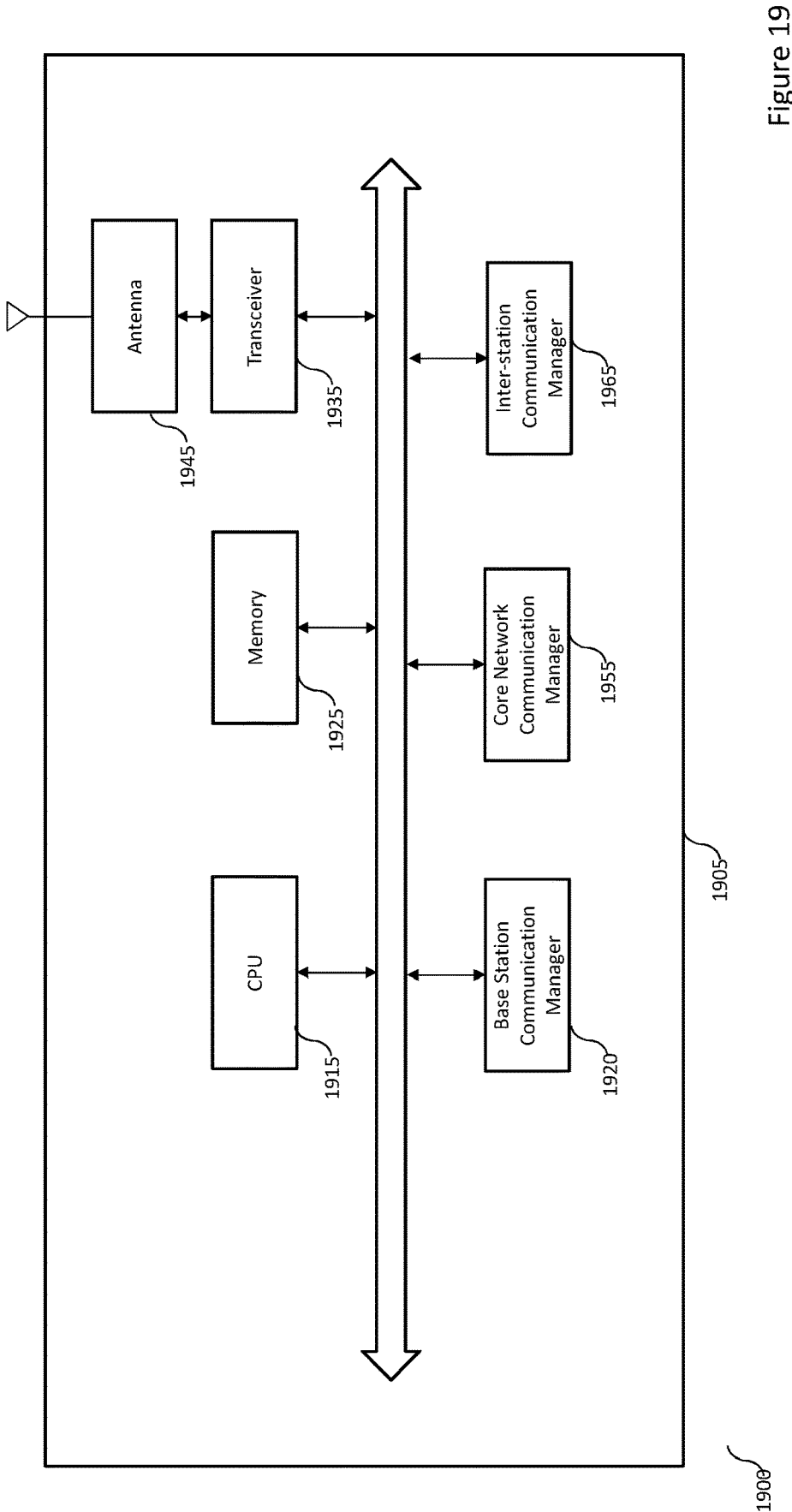
FIG. 19 illustrates a block diagram of a base station that supports Network Coding.

Receiver 1610 may refer to all or part of 1835 as described in FIG. 18 or 1935 as described in FIG. 19.

In one embodiment of the invention, the receiver 1605 may receive packets encoded with a network coding scheme, in relation with FIG. 3 and FIG. 4.

The Communication Manager 1620 is responsible for the establishment, the control and the release of a communication. The functions of Communication Manager 1620 may be distributed and not necessarily resident in a same physical location.

In one embodiment of the invention, the Communication Manager 1620 manages all or part of the Network Coding configuration and activation embodiments, in relation with FIGS. 8 to 15.

The Transmitter 1630 transmits both user plane and control plane packets, as well as synchronization signals, measurement signals, paging signals and signals specific to the initiation of a connection.

The Transmitter 1630 may refer to all or part of 1835 as described in FIG. 18 or 1935 as described in FIG. 19.

In one embodiment of the invention, the Transmitter 1630 may transmit packets encoded with a network coding scheme, in relation with FIG. 3 and FIG. 4.

Hardware, software and firmware can be used to implement the elements of device 1605. Hardware here includes CPUs, FPGAs, Application Specific Integrated Circuits as well as DSPs, GPUs, and discrete elements electronic, either logic or analog, or any combination of these means. When an element is virtualized, i.e. the function is implemented by the execution of a programmatic code, such code may be executed in a single or in parallel threads, upon a CPU, a DSP or a GPU, or even on a remote generic server. Communications between elements can be made by wires, buses or even optical fiber, or by memory buffers if the element is virtualized. The elements may be localized together or distributed in various places, even remote.

Figure 17:
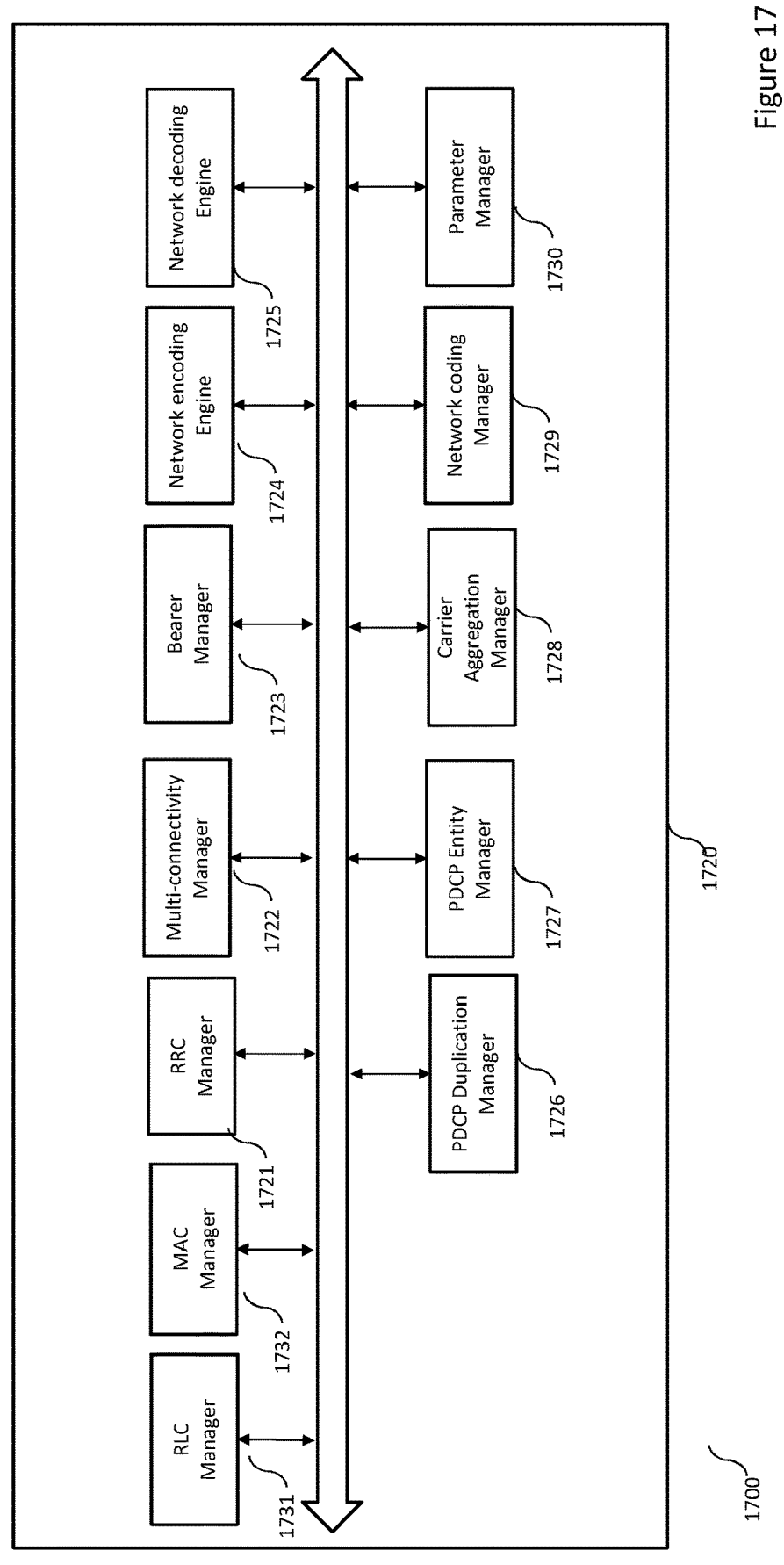
FIG. 17 illustrates a first block diagram of a Communication Manager that supports Network Coding according to the invention.

FIG. 17 illustrates a first block diagram 1700 of a Communication Manager 1720 that supports Network Coding according to embodiments of the invention. It is a non-limitative example of the Communication Manager 1620.

The Communication Manager operates several protocols, common to both ends of a wireless communication.

Communication Manager 1720 includes an RRC Manager 1721, a Multi Connection Manager 1722, a Bearer Manager 1723, a Network Encoding Engine 1724, a Network Decoding Engine 1725, a PDCP Duplication Manager 1726, a PDCP Entity Manager 1727, a Carrier Aggregation Manager 1728, a Network Coding Manager 1729, a Parameter Manager 1730, an RLC Manager 1731, and a MAC Manager 1732. Each of those elements can communicate with each other. The Network Decoding Engine 1725 implements the function described in FIG. 4. Network Encoding Engine 1724 implements the function described in FIG. 3. The Network Coding Manager 1729 is responsible for the set-up and release of Network Decoding Engine 1725 and Network Encoding Engine 1724.

Carrier Aggregation Manager 1728 establishes or releases the use of more than one bandwidth part between the base station and the UE. The Carrier Aggregation Manager has action upon the RLC layers and activates both a principal RLC and a secondary RLC if carrier aggregation is activated. In operation without Network Coding or without PDCP duplication, it behaves like a switch and activates alternatively a first RLC Layer and a second RLC layer.

Multi-Connectivity Manager 1722 establishes or releases the use of more than one bandwidth part between two base stations and the UE. The Multi-Connectivity Manager 1722 has action upon the RLC layers. It activates both a principal RLC and a secondary RLC if multi connection is activated, for user data, or just the principal if multi-connection is not activated.

RRC Manager 1721 handles the RRC protocol Engine. The RRC protocol Engine decodes the received messages following the ASN1 specification. In a UE, the RRC Manager 1721 extracts the parameters of Network Coding received from the base station and passes them to the Parameter Manager 1730, while in a base station, it uses the parameters stored in the Parameter Manager and pilots the RRC Protocol engine so that the latter encodes the parameters following the ASN.1 specification before sending them.

PDCP Duplication Manager 1726 handles and releases the use of more than one RLC for a flow of data. It behaves like a repeater in sending the same packet to the multiple RLC layers when duplication is enabled.

PDCP Entity Manager 1727 in the context of this invention handles the PDCP layer. A packet may or may not need header compression, or ciphering or integrity. The PDCP Entity Manager 1727 enables/disables these features. If Network Coding is enabled, it selects the specific header corresponding to the Network Coding.

Bearer Manager 1723 handles the SDAP layer. It enables the SDAP layer if the packet belongs to the user data plane, and disables the SDAP layer if the packet belongs to the control plane. Identically, it may enable the Network Coding operations if the packet belongs to the user data plane, and disable the Network Coding operations if the packet belongs to the control plane.

Network Coding Manager 1729 handles the Network encoding Engine 1724 and the Network Decoding Engine 1725. It sets the Network Coding parameters when required. The parameters may be stored into the device, or in the Core Network. Network Coding Manager 1729 enables/disables Network Encoding Engine 1724 and/or Network Decoding Engine 1725, according to the selected transmission scheme.

RLC Manager 1731 handles the RLC layer(s). It may enable more than one RLC Layer if the device is in Carrier Aggregation or in Multi-Connectivity.

MAC Manager 1732 handles the MAC Layer(s). It may enable more than one MAC Layer if the device is in Multi-Connectivity and the device is a UE.

FIG. 18 illustrates a block diagram 1800 of a UE system 1805 that supports Network Coding according to one embodiment of the invention. The device includes components for transmitting and receiving communications, including a UE Communication Manager 1820, a I/O controller 1855, a Transceiver 1835, one or more antennas 1845, Memory 1825, and a Processor 1815. All these elements may communicate with each other.

Memory 1825 includes RAM, ROM, or combination of both or as a non-limitative example a mass storage device such as a disk or a Solid-State Drive. Basic Input Output System (BIOS) Instructions may be stored within the Memory.

The processor 1845 is configured to execute machine readable instructions. Execution of these machine-readable instructions causes the device to perform various functions. These functions may be related to transmission (and in particular to Network Coding), or to interaction with peripheral devices like for instance a keyboard, a screen, a mouse, etc. The processor may run an operating system like for instance, iOS, windows, Android, etc.

The I/O Controller 1855 allows these interactions with external peripherals by providing the hardware required and by managing input and output signals.

The transceiver 1835 communicates bi-directionally in wireless with other wireless devices. It provides the necessary modems and frequency shifters necessary to connect to Wi-Fi, Bluetooth, LTE, 5G NR, etc.

The communications go through sets of one or many antennas adapted to the spectrum of the frequency transposed signals, issued from the baseband modems. Each antenna set may be limited to one antenna, but preferably it contains several antennas, in order to provide beam forming capability.

UE Communication Manager 1820 handles the communication establishment of the UE to a Radio Access Network, its control and its release. In one embodiment of the invention, UE Communication Manager 1820 refers to a communication manager 1620 or 1720.

The UE receives from the base station an indication of slots available for its transmission. It then knows where in time and frequency it expects incoming data or must send its outgoing data, whether they belong to the control or data plane. In particular, it may receive, from the base station, the Network Coding parameters to apply for a downlink or an uplink transmission. In one embodiment of the invention, this is achieved according to process flows of FIGS. 8 to 15.

FIG. 19 illustrates a block diagram 1900 of a base station 1905 that supports Network Coding in an embodiment of the invention. The device includes components for transmitting and receiving communications, including a base station Communication Manager 1920, a Core Network Communication Manager 1955, a Transceiver 1935, one or many antennas 1945, Memory 1925, a Processor 1915, and an Inter Station Communication Manager 1965. All these elements may communicate with each other.

The base station Communication Manager 1920 handles the communications with a plurality of UEs. It is responsible for the establishment, the control and the release of these communications. The base station Communication Manager 1920 includes a scheduler. The scheduler allocates time-frequency slots to the different UE communications. An information regarding the schedule of occupation of these slots is sent to all active UEs. In one embodiment of the invention, the base station Communication Manager 1920 refers to a communication manager 1620 or 1720.

The Core Network Communication Manager 1955 manages communications of the base station with the core network.

The Transceiver 1935 communicates bi-directionally in wireless with other wireless devices. These devices may be UEs, or even other base stations. The transceiver provides the necessary modems and frequency shifters in order to connect to a large number of UEs simultaneously, using different frequency carriers, in Time Division Duplex (TDD) or in Frequency Division Duplex (FDD). The transceiver may provide MIMO coding. The transceiver is connected to antennas.

The antenna set may be limited to one antenna, but preferably it contains several antennas, in order to provide beam forming capability.

Memory 1925 includes RAM, ROM, or combination of both or as a non-limitative example a mass storage device such as a disk or a Solid-State Drive. BIOS Instructions may be stored within the Memory to support an operating system.

The processor 1915 executes computer readable instructions performing various functions, for instance the functions related to the Network Coding.

The interstation communication manager 1965 manages communications with other base stations. The interstation communication manager may provide a standardized Xn interface, as defined by 3GPP standards, to support these communications.

Figure 20:
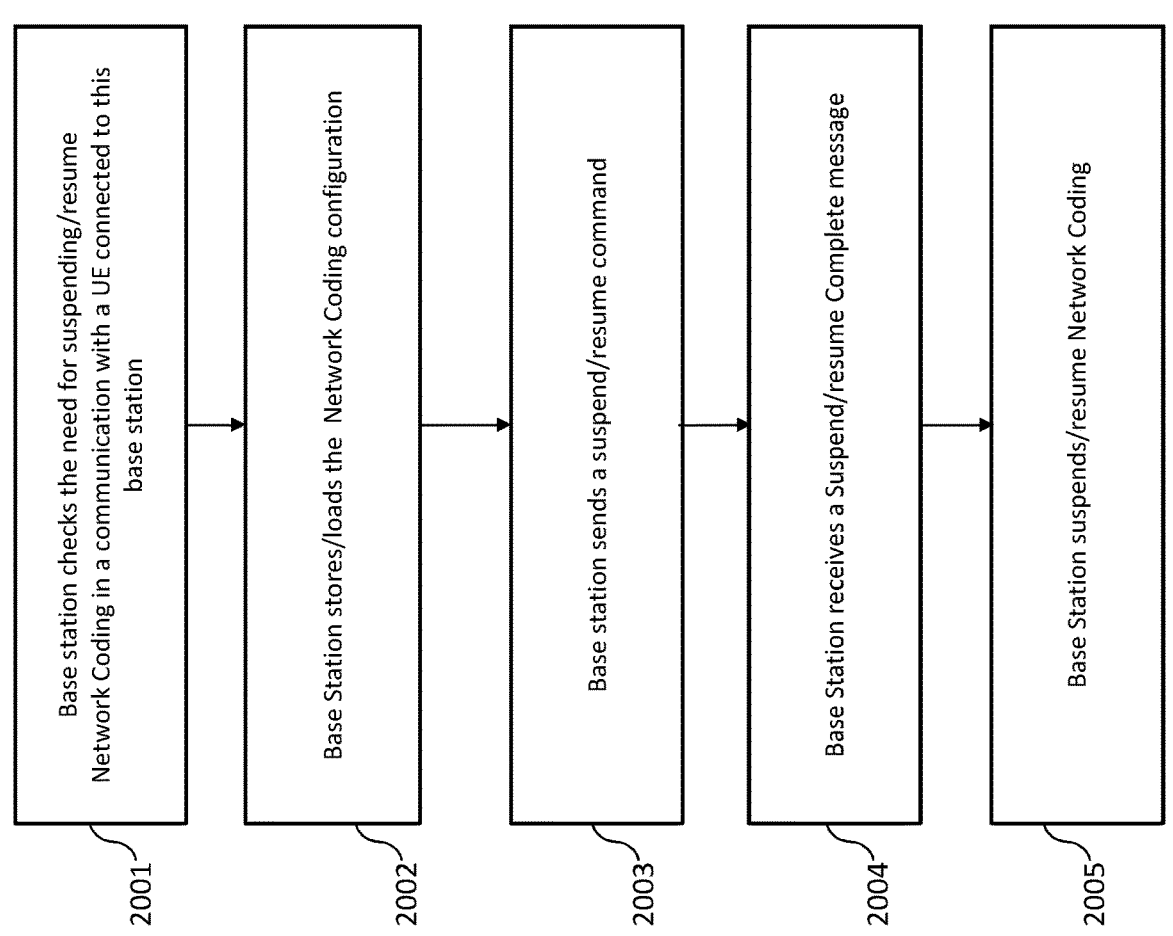
FIG. 20 illustrates a flowchart illustrating a method that supports Network Coding suspend/resume operation through a configuration message, at the Base Station level according to an embodiment of the invention.

FIG. 20 illustrates a flowchart 2000 illustrating a method that supports Network Coding suspend/resume operation through a configuration message, at the Base Station level according to an embodiment of the invention. The operation within this method may be implemented by a base station 1600, for instance, in the Communication Manager 1620 of FIG. 16.

The UE is assumed to be in connected mode, and UE is exchanging Control and User Data with the base station, in relation with FIG. 8.

As a background process, the base station follows up the evolution of the network system.

The UE sends regularly evaluations of the channel conditions, or reference signals known by the Base Station. These signals are, per example in 5G NR, either (CSI-RS) Channel Side Information Reference Signal, which is calculated from the distortion of a reference signal sent by the Base Station, and Sounding Reference Signal (SRS), a signal sent by the UE and known by the Base Station. CSI RS allows to determine the quality of the downlink, SRS allows to determine quality of the uplink.

Firstly, we describe the suspension of the Network Coding Operation:

At step 2001 the base station detects the need for suspending Network Coding on its connection with the UE. According to some embodiments of the invention this need may result from an amelioration in the quality of transmission, due to the UE environment or to less interferences coming from connections of other UEs, or a higher load of the Base Station. These are of course non-limitative examples and the one skilled in the art may consider several other causes for suspending Network Coding. The need may arise for any bearer (uplink and downlink) that may be established between the base station and the UE.

At step 2002 the base station stores the Network coding Configuration that was currently in use.

At step 2003 the Base Station sends a suspend command. This command is per example, but non-limitatively a RRCReconfiguration message as defined by the TS38.331 release 16, amended to carry an indication of the suspension.

At step 2004 the Base Station receives a confirmation message "Suspend Complete message" sent by the UE. This message may be a RRCComplete message as defined by the TS38.331 release 16.

At step 2005 the Base Station suspends the Network Coding, by configuring its layer managers of block diagram 1700. It may happen that some user data packets are inside the protocol stack, below the layer where Network Coding is calculated. This packet may be flushed, and should be resent without Network Coding.

Secondly, we describe the resume Network Coding operations:

At step 2001 the base station detects the need for resuming Network Coding on its connection with the UE. According to some embodiments of the invention this need may result from a deterioration in the quality of transmission, due to the UE environment or to more interferences coming from connections of other UEs, or a lesser load of the Base Station. These are of course non-limitative examples and the one skilled in the art may consider several other causes for resuming Network Coding. The need may arise for any bearer (uplink and downlink) that may be established between the base station and the UE.

At step 2002 the base station loads the Network coding Configuration that was currently suspended.

At step 2003 the Base Station sends a Resume command. This command is per example, but not restrictively a RRCReconfiguration message as defined by the TS38.331 release 16, amended to carry an indication of the suspension. This Reconfiguration message may also carry the retrieved Network Coding Configuration, retrieved at step 2402.

At step 2004 the Base Station receives a confirmation message "Resume Complete message" sent by the UE. This message may be a RRCComplete message as defined by the TS38.331 release 16.

At step 2005 the Base Station resumes the Network Coding, by configuring its layer managers of block diagram 1700.

Figure 21:
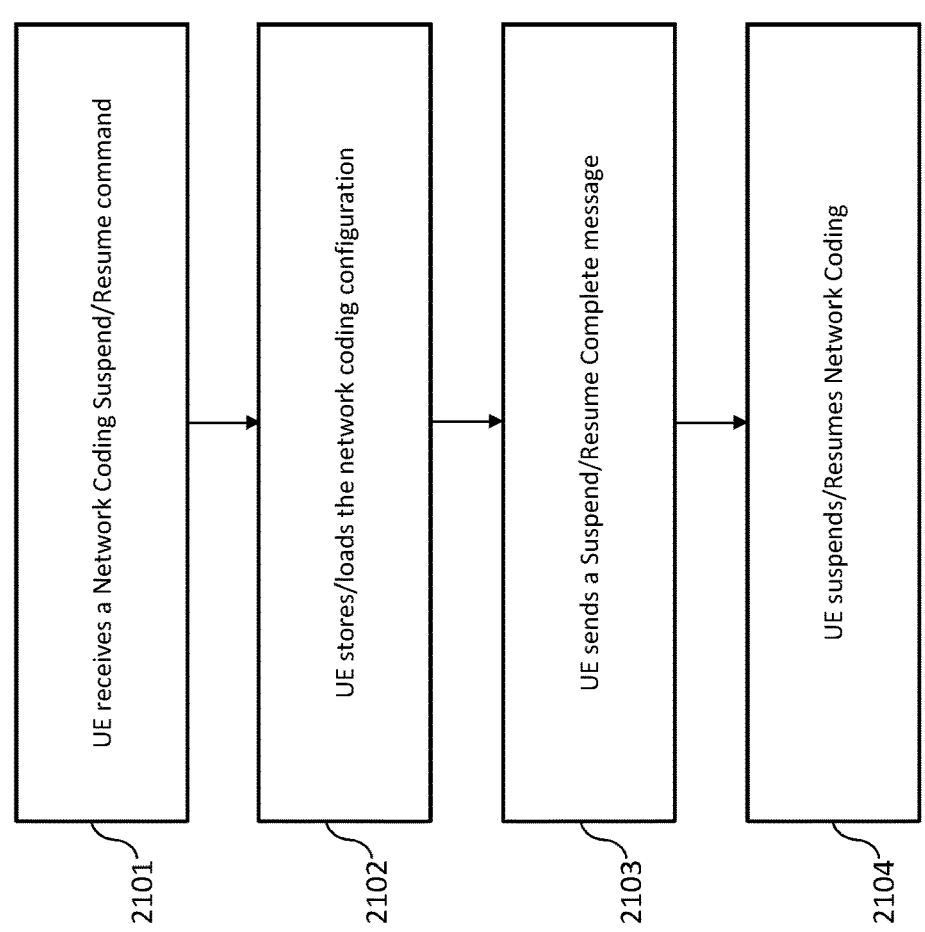
FIG. 21 illustrates a flowchart illustrating a method that supports Network Coding suspend/resume operation through a configuration message, at the UE level according to an embodiment of the invention.

FIG. 21 illustrates a flowchart 2100 illustrating a method that supports Network Coding suspend/resume operation through a configuration message, at the UE level according to an embodiment of the invention. The operation within this method may be implemented by a UE 1600, for instance, in the Communication Manager 1620 of FIG. 16.

The UE is assumed to be in connected mode, and UE is exchanging Control and User Data with the base station, in relation with Figure with FIG. 8.

Description of the suspension of network coding operation:

At step 2101, the UE receives a message sent by the Base Station and indicating Network Coding Suspension. This message is per example, but non-limitatively a RRCReconfiguration message as defined by the TS38.331 release 16, amended to carry an indication of the suspension.

At step 2102, the UE stores the current Network Coding configuration. It may have been received with the message carrying the suspension or it may have been a configuration received with a previous configuration message.

At step 2103, the UE sends a suspend complete message. As indicated above, it may be a RRCComplete message as defined by the TS38.331 release 16.

At step 2104, the UE suspends the Network Coding, by configuring its layer managers of block diagram 1700.

Description of the resuming of network coding operation:

At step 2101, the UE receives a message sent by the Base Station and indicating Network Coding Resume. This message is per example, but not restrictively a RRCReconfiguration message as defined by the TS38.331 release 16, amended to carry an indication of the resuming.

At step 2102, the UE loads the Network Coding configuration. It may have been received with the message carrying the suspension or it may have been a configuration received with a previous configuration message.

At step 2103, the UE sends a Resume Complete message. As indicated above, it may be a RRCComplete message as defined by the TS38.331 release 16.

At step 2104, the UE resumes the Network Coding, by configuring its layer managers of block diagram 1700.

Figure 22:
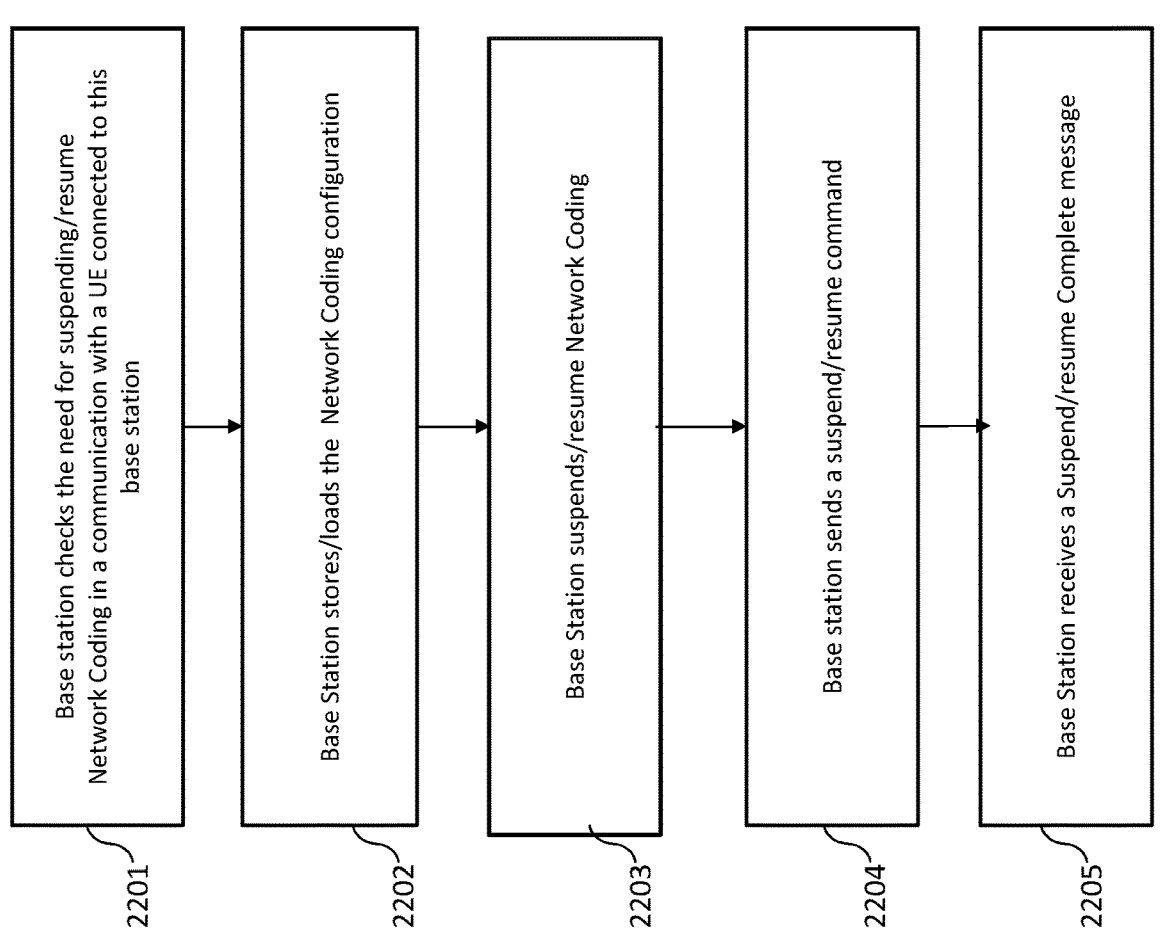
FIG. 22 illustrates a flowchart illustrating a method that supports Network Coding suspend/resume operation through a MAC sub header, at the Base Station level according to an embodiment of the invention.

FIG. 22 illustrates a flowchart 2200 illustrating a method that supports Network Coding suspend/resume operation through a MAC sub header, at the Base Station level according to an embodiment of the invention. The operation within this method may be implemented by a base station 1600, for instance, in the Communication Manager 1620 of FIG. 16.

The UE is assumed to be in connected mode, and UE is exchanging Control and User Data with the base station, in relation with FIG. 9.

As a background process, the base station follows up the evolution of the network system.

The UE sends regularly evaluations of the channel conditions, or reference signals known by the Base Station. These signals are, per example in 5G NR, either (CSI-RS) Channel Side Information Reference Signal, which is calculated from the distortion of a reference signal sent by the Base Station, and Sounding Reference Signal, a signal sent by the UE and known by the Base Station. CSI RS allows to determine the quality of the downlink, SRS allows to determine quality of the uplink.

Firstly, we describe the suspension of the Network Coding Operation:

At step 2201 the base station detects the need for suspending Network Coding on its connection with the UE. According to some embodiments of the invention this need may result from an amelioration in the quality of transmission, due to the UE environment or to less interferences coming from connections of other UEs, or a higher load of the Base Station. These are of course non-limitative examples and the one skilled in the art may consider several other causes for suspending Network Coding. The need may arise for any bearer (uplink and downlink) that may be established between the base station and the UE.

At step 2202 the base station stores the Network coding Configuration that was currently in use.

At step 2203 the Base Station suspends the Network Coding, by configuring its layer managers of block diagram 1700.

At step 2204 the Base Station sends a suspend command. This command is carried by a MAC CE.

At step 2204 the Base Station receives a confirmation message "NC Suspend Complete" sent by the UE. This message is carried by a MAC CE.

Secondly, we describe the resume Network Coding operations:

At step 2201 the base station detects the need for resuming Network Coding on its connection with the UE. According to some embodiments of the invention this need may result from a deterioration in the quality of transmission, due to the UE environment or to more interferences coming from connections of other UEs, or a lesser load of the Base Station. These are of course non-limitative examples and the one skilled in the art may consider several other causes for resuming Network Coding. The need may arise for any bearer (uplink and downlink) that may be established between the base station and the UE.

At step 2202 the base station loads the Network coding Configuration that was currently suspended.

At step 2003 the Base Station resumes the Network Coding, by configuring its layer managers of block diagram 1700.

At step 2204 the Base Station sends a NC Resume command. This message may be carried by a MAC CE.

At step 2205 the Base Station receives a confirmation message "NC Resume Complete" sent by the UE. This message may be carried by a MAC CE.

Figure 23:
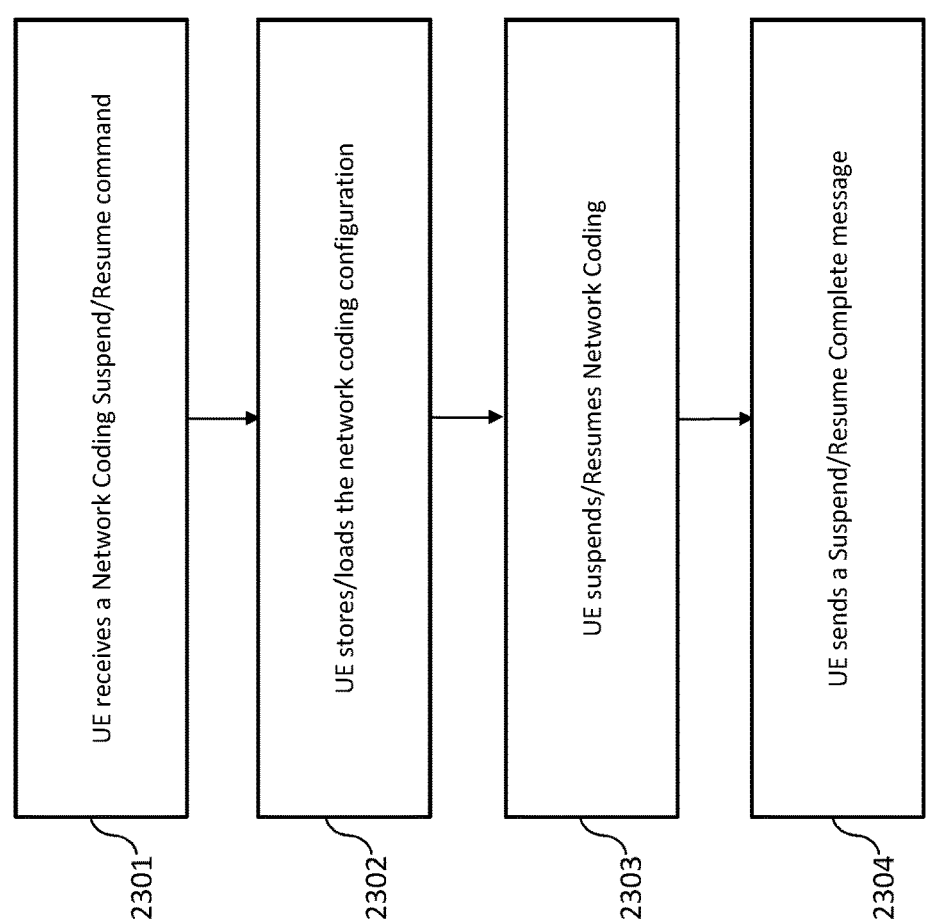
FIG. 23 illustrates a flowchart illustrating a method that supports Network Coding suspend/resume operation through a MAC sub header, at the UE level according to an embodiment of the invention.

FIG. 23 illustrates a flowchart 2300 illustrating a method that supports Network Coding suspend/resume operation through a MAC sub header, at the UE level according to an embodiment of the invention. The operation within this method may be implemented by a UE 1600, for instance, in the Communication Manager 1620 of FIG. 16.

The UE is assumed to be in connected mode, and UE is exchanging Control and User Data with the base station, in relation with FIG. 9.

Description of the suspension of network coding operation:

At step 2301, the UE receives a message sent by the Base Station and indicating Network Coding Suspension. This message may be carried by a MAC CE.

At step 2302, the UE stores the current Network Coding configuration. It may have been received with the message carrying the suspension or it may have been received with a previous configuration message.

At step 2304, the UE suspends the Network Coding, by configuring its layer managers of block diagram 1700.

At step 2304, the UE sends a NC suspend complete message. This message may be carried by a MAC CE.

Description of the resuming of network coding operation:

At step 2302, the UE loads the Network Coding configuration. It may have been received with the message carrying the suspension or it may have been received with a previous configuration message.

At step 2303, the UE resumes the Network Coding, by configuring its layer managers of block diagram 1700.

At step 2304, the UE sends a NC Resume Complete message. This message may be carried by a MAC CE.

FIG. 24 illustrates a flowchart 2400 illustrating a method that supports Network Coding suspend/resume operation through a MAC sub header, at the Base Station level with optional confirmation of execution according to an embodiment of the invention. The operation within this method may be implemented by a base station 1600, for instance, in the Communication Manager 1620 of FIG. 16.

The UE is assumed to be in connected mode, and UE is exchanging Control and User Data with the base station, in relation with FIG. 10.

Firstly, we describe the suspension of the Network Coding Operation:

At step 2401 the base station receives a NC suspend request from the UE. The suspend request may be provoked by an excessive load of the UE, or, per example, an overheating condition. This message may be by a MAC CE, but it may also be a message like the RRC message FailureInformation also described in TS 38.331, or alternatively the message UEAssistanceInformation also described in TS 38.331.

At step 2402 the Base Station checks the need for suspension of the Network Coding operations. The Base Station may consider the request is not necessary, in view of the scheduler queue, or other parameters which are not accessible to the UE.

At step 2403 the base station stores the Network coding Configuration that was currently in use.

At step 2404 the Base Station suspends the Network Coding, by configuring its layer managers of block diagram 1700, and sends a suspend command. This command may be carried by a MAC CE.

Optionally, at step 2405 the Base Station receives a confirmation message "NC Suspend Complete" sent by the UE. This message may be carried by a MAC CE.

Secondly, we describe the resume Network Coding operations:

At step 2401 the base station receives a NC resume request from the UE. This may be due to a return to normal conditions for the UE system. This message may be carried by a MAC CE.

At step 2402 the Base Station checks the need for resuming of the Network Coding operations. The Base Station may consider the request is not possible, in view of the scheduler queue, or other parameters which are not accessible to the UE.

At step 2403 the base station loads the Network coding Configuration that was currently suspended.

At step 2404 the Base Station resumes the Network Coding, by configuring its layer managers of block diagram 1700, and sends a NC Resume command. This message may be carried by a MAC CE.

Optionally, at step 2405 the Base Station receives a confirmation message "NC Resume Complete" sent by the UE. This message may be carried by a MAC CE.

Figure 25:
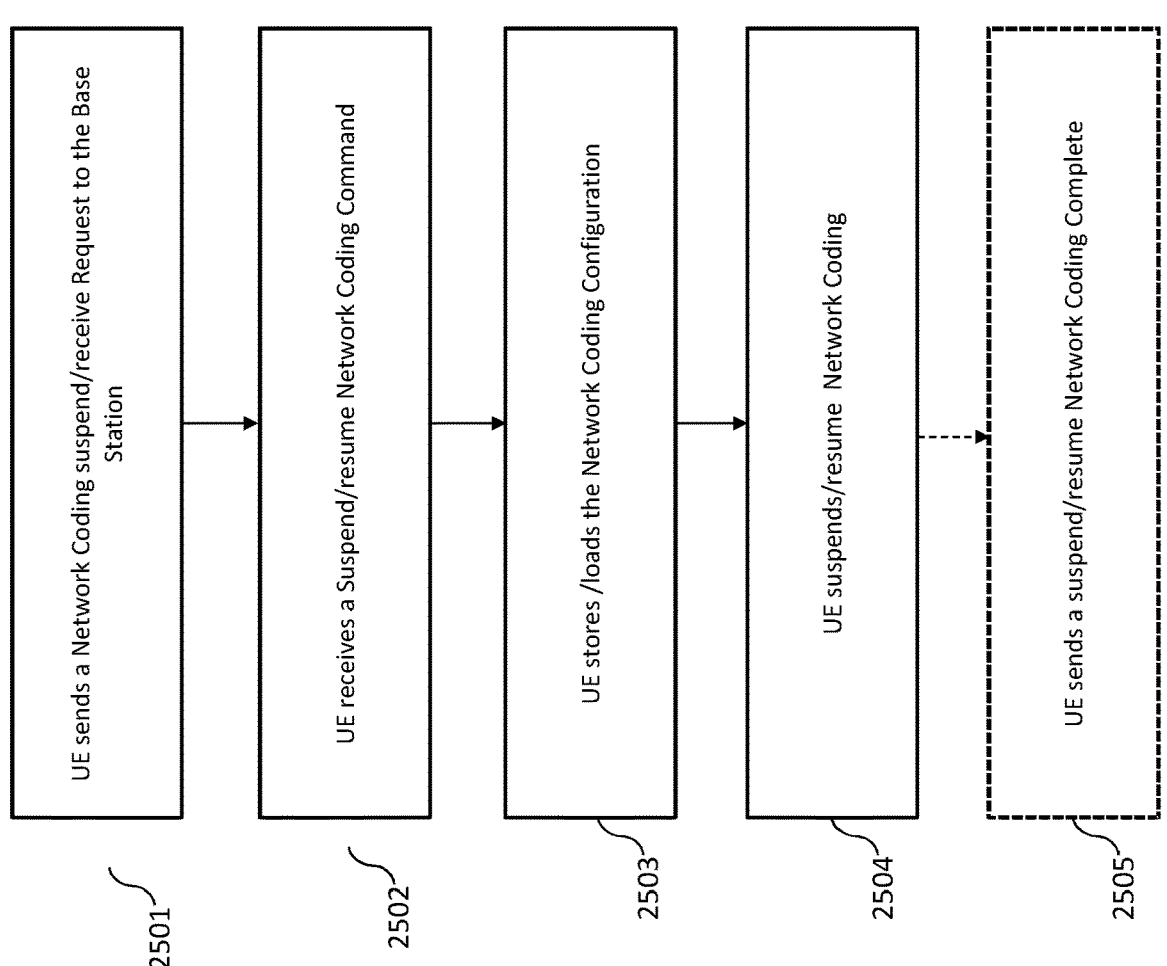
FIG. 25 illustrates a flowchart illustrating a method that supports Network Coding resume operation through a MAC sub header or configuration message, at the UE level with optional confirmation of execution according to an embodiment of the invention.

FIG. 25 illustrates a flowchart 2500 illustrating a method that supports Network Coding resume operation through a MAC sub header or configuration message, at the UE level with optional confirmation of execution according to an embodiment of the invention. The operation within this method may be implemented by a base station 1600, for instance, in the Communication Manager 1620 of FIG. 16.

The UE is assumed to be in connected mode, and UE is exchanging Control and User Data with the base station, in relation with FIG. 10.

Firstly, we describe the suspension of the Network Coding Operation:

At step 2501 The UE sends a suspend request to the Base Station. The suspend request may be provoked by an excessive load of the UE, or, per example, an overheating condition. This message may be carried by a MAC CE, but it may also be a message like the RRC message FailureInformation also described in TS 38.331, or alternatively the message UEAssistanceInformation also described in TS 38.331.

At step 2502 the UE receives a suspend Network Coding command. This message may be carried by a MAC CE.

At step 2503 the UE stores the Network coding Configuration that was currently in use.

At step 2504 the UE suspends the Network Coding, by configuring its layer managers of block diagram 1700, and sends a NC suspend command. This command may be carried by a MAC CE.

Optionally, at step 2505 the UE sends a confirmation message "NC Suspend Complete" to the Base Station. This message may be carried by a MAC CE.

Secondly, we describe the resume Network Coding operations:

At step 2501 The UE sends a resume request to the Base Station. The resume request may be provoked by a return to normal conditions of the UE. This message may be carried by a MAC CE.

At step 2502 the UE receives a NC resume command from the Base Station. This message may be carried by a MAC CE.

At step 2503 the UE loads the Network coding Configuration that was currently suspended.

At step 2504 the UE resumes the Network Coding, by configuring its layer managers of block diagram 1700.

Optionally, at step 2505 the UE sends a confirmation message "NC Resume Complete" to the Base Station. This message may be carried by a MAC CE.

FIG. 26 illustrates a flowchart 2600 illustrating a method that supports Network Coding resume operation through a MAC sub header, at the Base Station level, after a UE Power Saving mode according to an embodiment of the invention. The operation within this method may be implemented by a base station 1600, for instance, in the Communication Manager 1620 of FIG. 16. The UE is in connected mode at the beginning of the flowchart. The flowchart is specific to 5G NR and its mechanism of power consumption control, in relation with the FIG. 13.

At step 2601, the Base Station sends an RRC Release message. The first effect of this message is to suspend all message exchanges on the data bearers, and hence, it will automatically terminate Network Coding Operations. However, The Base Station may decide to send an RRC Release Message with an indication of suspension of Network Coding, in order to not lose the current configuration.

At step 2602, the Base Station stores the Network Coding Configuration that was in use before Release.

At step 2603, the Base Station receives an RRC Resume Request, to resume the connection.

At step 2604, the Base Station checks if the need for Network Coding operation is necessary, with an identical or different set up as previously used.

At step 2605, upon the positive check of step 2604, the base station reloads its stored network coding configuration.

At step 2606, the Base Station resumes the Network Coding Operations.

At step 2607, the Base Station sends an RRC Resume Command. It must be understood that the RRC Resume Command as defined in TS38.331 contains all the parameter of the RRCReconfiguration command defined also in TS38.331. The Base Station may use the command to modify the Network Coding parameters, if a different set up is necessary, or may even omit the parameters, but indicate the Network Coding will resume.

At step 2608, the Base Station receives the RRC Resume Complete message that validates the execution of the configuration on the UE side.

Figure 27:
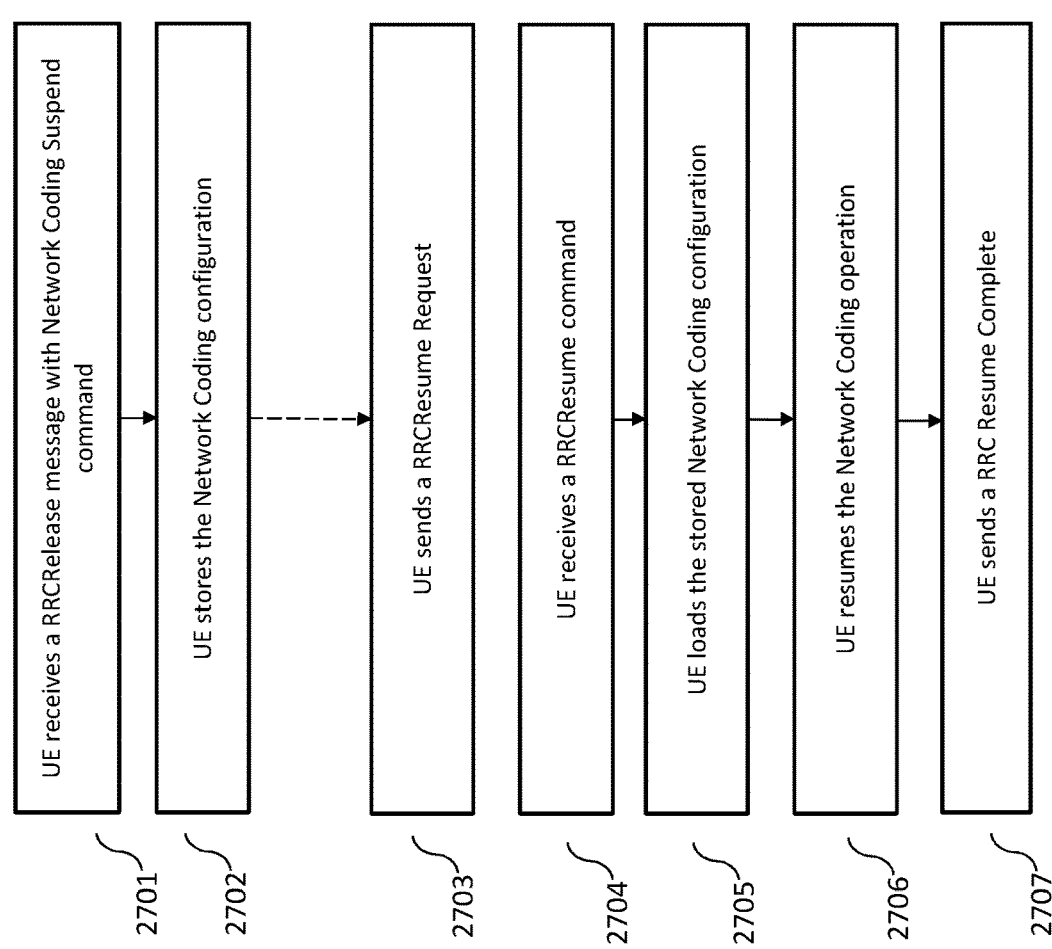
FIG. 27 illustrates a flowchart illustrating a method that supports Network Coding resume operation through a MAC sub header or configuration message, at the UE level, after its Power Saving mode according to an embodiment of the invention.

FIG. 27 illustrates a flowchart 2700 illustrating a method that supports Network Coding resume operation through a MAC sub header or configuration message, at the UE level, after its Power Saving mode according to an embodiment of the invention. The operation within this method may be implemented by a UE 1600, for instance, in the Communication Manager 1620 of FIG. 16. The UE is in connected mode at the beginning of the flowchart. The flowchart is specific to 5G NR and its mechanism of power consumption control, in relation with the FIG. 13.

At step 2701, the UE receives an RRCRelease message with a Network Coding suspend indication, which forces the UE to store the Network Coding configuration in memory at step 2702, before entering in Power Saving mode.

At step 2703, either because it has some message to send, or it has received a Paging message, the UE needs to get out of the Power Saving mode to a communication mode. To realize that, it sends a RRCResumeRequest message to the Base Station.

In return, at step 2704, the UE receives a RRCResume command. This message described in TS38.331 release 16 may optionally contain a whole Network Coding Configuration. If it does contain the configuration, the UE will pass over the step 2705.

At step 2705, in the case were the Network Coding parameters were omitted, the UE loads from memory the Network Coding configuration once memorized at step 2702.

At step 2706, the UE resumes the Network coding operation, either with the newly received parameters or with the memorized ones.

At step 2706, the UE sends to the Base Station a RRCResumeComplete message. This message is described in TS38.331 release 16.

In the FIGS. 20 to 27, the notification of NC suspend/resume may be global, meaning it is to be applied to all existing DRBs between base station and UE, or there may be one notification per DRB.

Figure 28:
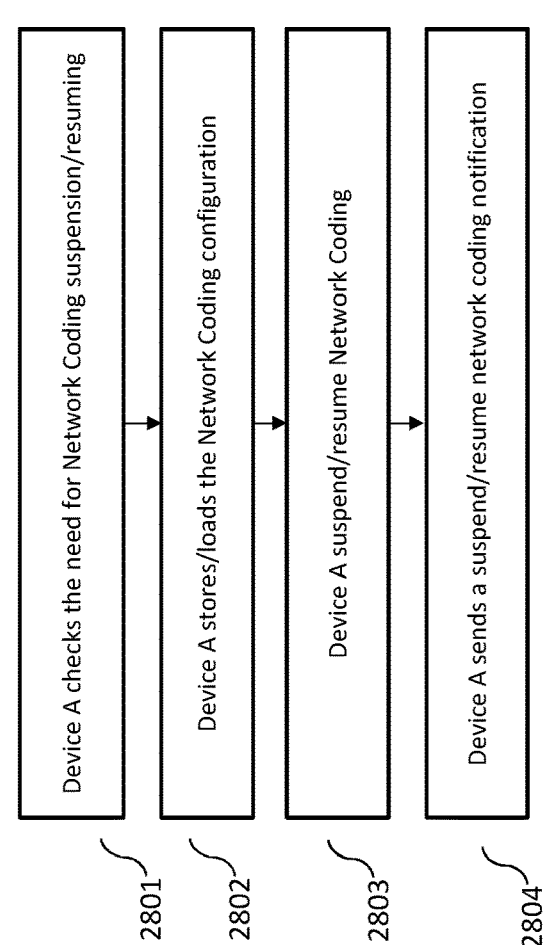
FIG. 28 illustrates a flowchart illustrating a method that supports Network Coding suspend operation through a header indication, at any of the devices (BS or UE) according to an embodiment of the invention.

FIG. 28 illustrates a flowchart 2800 illustrating a method that supports Network Coding suspend operation through a header indication, at any of the devices (BS or UE) according to an embodiment of the invention, in relation with the FIGS. 11 and 12. The operation is symmetrical, the letters A and B will stand for a User Equipment and a Base Station, or a Base Station and a User Equipment. The operation within this method may be implemented by a base station or a UE, both described in blocks in reference 1600, for instance, in the Communication Manager 1620 of FIG. 16.

Flowchart relative to suspension of Network Coding Operation:

At step 2801, device A checks for Network coding suspension.

At step 2802, device A stores the Network coding configuration, prior to suspension at step 2803. Then device A sends a suspend Network Coding Notification to device B (2804). The notification is carried by an information in a header, more specifically the header of the protocol layer where the Network Coding calculation is implemented. In a non-limitative example, it may be the PDCP header.

Flowchart relative to resuming of Network Coding Operation:

At step 2801, device A checks for Network coding resuming.

At step 2802, device A loads the Network coding configuration that was stored in memory prior to the suspension, prior to resuming Network Coding Operation at step 2803. Then device A sends a Resume Network Coding Notification to device B (2804). The notification is carried by an information in a header, more specifically the header of the protocol layer where the Network Coding calculation is implemented. In a non-limitative example, it may be the PDCP header.

Figure 29:
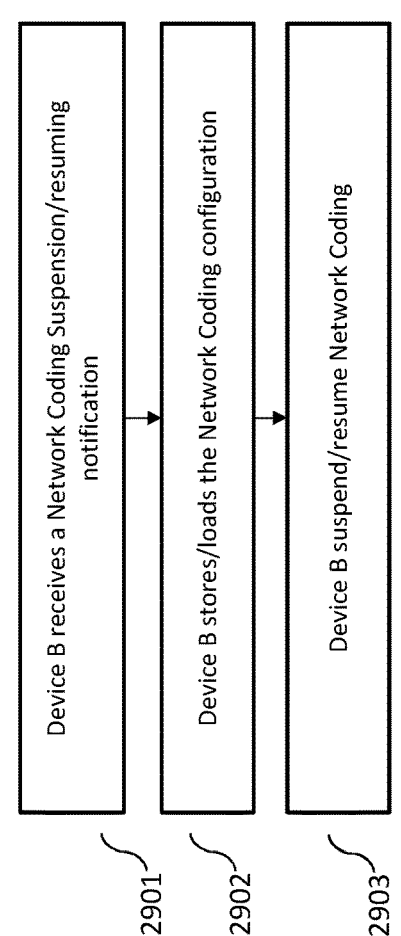
FIG. 29 illustrates a flowchart illustrating another method that supports Network Coding suspend operation through a header indication, at the other device (UE or BS) according to an embodiment of the invention.

FIG. 29 illustrates a flowchart 2900 illustrating another method that supports Network Coding suspend operation through a header indication, at the other device (UE or BS)

according to an embodiment of the invention, in relation with the FIGS. 11 and 12. The operation is symmetrical, the letters A and B will stand for a User Equipment and a Base Station, or a Base Station and a User Equipment. The operation within this method may be implemented by a base station or a UE, both described in blocks in reference 1600, for instance, in the Communication Manager 1620 of FIG. 16.

Flowchart relative to suspension of Network Coding Operation:

At step 2901, device B receives a Network Coding Suspension notification.

At step 2902, device B stores the Network coding configuration, prior to suspension at step 2903. The notification is carried by an information in a header, more specifically the header of the protocol layer where the Network Coding calculation is implemented. In a non-limitative example, it may be the PDCP header.

Flowchart relative to resuming of Network Coding Operation:

At step 2901, device B receives a Network Coding resuming notification.

At step 2902, device B loads the Network coding configuration that was stored in memory prior to the suspension, prior to resuming Network Coding Operation at step 2903. The notification is carried by an information in a header, more specifically the header of the protocol layer where the Network Coding calculation is implemented. In a non-limitative example, it may be the PDCP header.

In the FIGS. 28 and 29, the notification of NC suspend/resume is applicable to the DRB used to transmit the packet(s) containing the notification.

Figure 30:
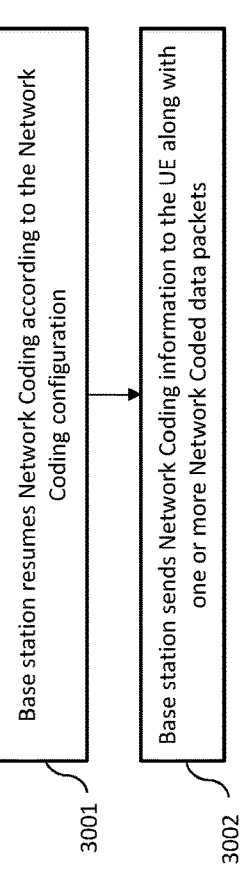
FIG. 30 illustrates a flowchart illustrating a method that supports Network Coding resume operation through a header indication or a MAC CE, at the Base Station according to an embodiment of the invention.

FIG. 30 illustrates a flowchart 3000 illustrating a method that supports Network Coding resume operation through a header indication or a MAC CE, at the Base Station according to an embodiment of the invention, in relation with the FIG. 14. The operation within this method may be implemented by a base station 1600, for instance, in the Communication Manager 1620 of FIG. 16.

At step 3001, the base station resumes the Network Coding scheme on its side, according to the predetermined Network Coding configuration established, then suspended. The base station has configured its protocol layers, now it resumes the NC scheme. Since Network Coding is applied, changes happen in the PDUs carried by the bearer. Per example, not restrictively, the PDCP header may be modified to indicate that a PDU belongs to the NC scheme.

At step 3002, the base station sends a data packet to the UE resulting of the base station resuming of the Network Coding operation.

Figure 31:
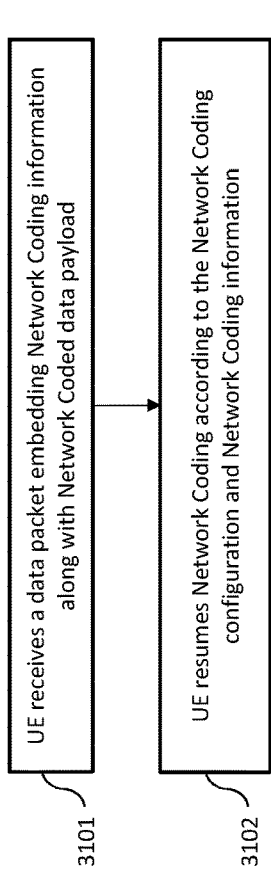
FIG. 31 illustrates a flowchart illustrating another method that supports Network Coding resume operation through a header indication or a MAC CE, at the UE according to an embodiment of the invention.

FIG. 31 illustrates a flowchart 3100 illustrating another method that supports Network Coding resume operation through a header indication or a MAC CE, at the UE according to an embodiment of the invention, in relation with the FIG. 14. The operation within this method may be implemented by a UE 1600, for instance, in the Communication Manager 1620 of FIG. 16.

At step 3101, The UE recovers the Network Coding information. As said in the description of FIG. 9 above, the transmitted data packet embeds payload data and Network Coding Information, indicating that the data packet is now Network Coded, as the Network Coding operation is resumed.

At step 3102, the UE resumes the Network Coding. As resuming Network Coding this way does not modify the Carrier Aggregation or Dual Connectivity mode, if these modes were previously set, then they will be operating.

Figure 32:
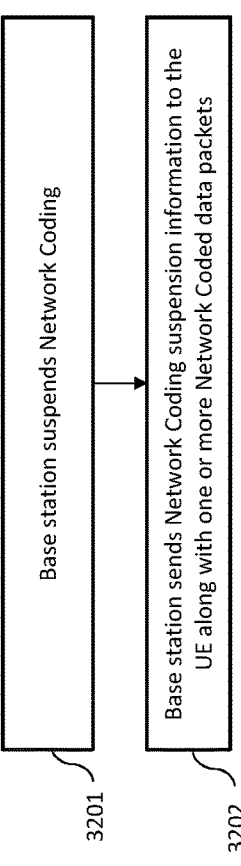
FIG. 32 illustrates a flowchart illustrating a method that supports Network Coding suspend operation through a header indication or a MAC CE, at the Base Station according to an embodiment of the invention.

FIG. 32 illustrates a flowchart 3200 illustrating a method that supports Network Coding suspend operation through a header indication or a MAC CE, at the Base Station according to an embodiment of the invention, in relation with FIG. 15. The operation within this method may be implemented by a base station 1600, for instance, in the Communication Manager 1620 of FIG. 16.

At step 3201, the base station suspends the Network Coding scheme on its side. Since Network Coding code is suspended, changes happen in the PDUs carried by the bearer. The transmitted data packet embeds payload data and Network Coding Information, indicating that the data packet is now not Network Coded, as the Network Coding operation is suspended.

At step 3202, the base station sends a data packet resulting of the base station suspension to the UE.

In flowchart 3200 and 3300, Suspend/resume Notification is carried by the same data packet where the notification is effective. This method provides synchronization and avoids flushing data packets that were pending reception at the time the notification was received.

Figure 33:
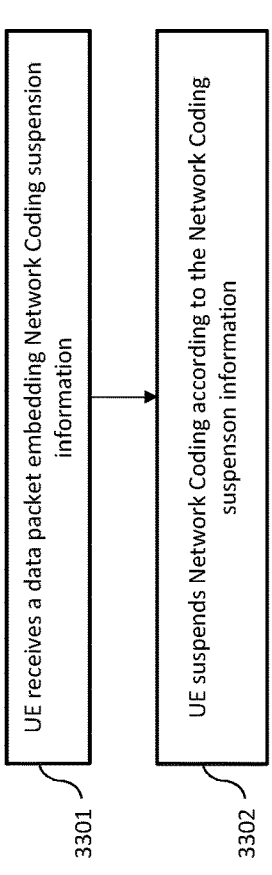
FIG. 33 illustrates a flowchart illustrating another method that supports Network Coding suspend operation through a header indication of a MAC CE, at the UE according to an embodiment of the invention.

FIG. 33 illustrates a flowchart 3300 illustrating another method that supports Network Coding suspend operation through a header indication of a MAC CE, at the UE according to an embodiment of the invention, in relation with the FIG. 15. The operation within this method may be implemented by a UE 1600, for instance, in the Communication Manager 1620 of FIG. 16.

At step 3301, The UE recovers the Network Coding information. As said in FIG. 32 description, the transmitted data packet embeds payload data and Network Coding Information, indicating that the data packet is not Network Coded.

At step 3302, the UE suspends the Network Coding.

Figure 34:
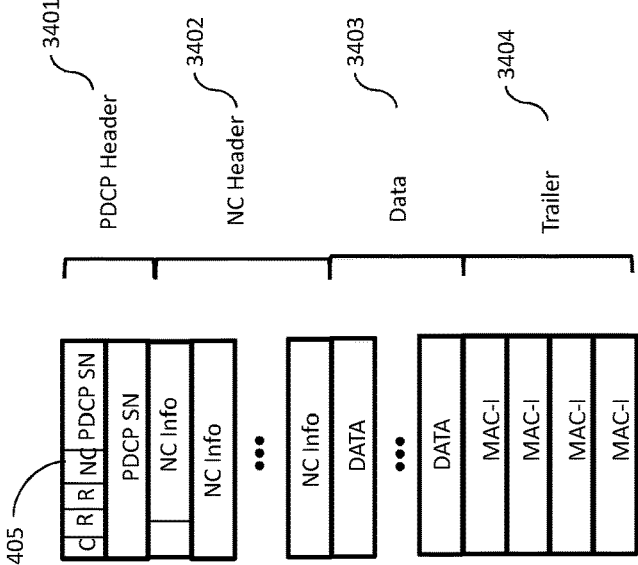
FIG. 34 illustrates the format of a PDCP packet according to an embodiment of the invention.

FIG. 34 illustrates the format of a PDCP packet 3400 at the interface between the PDCP layer and the RLC layer according to one embodiment of the invention. It reuses the PDCP format as defined in the specification TS38.323, issued by the 3GPP organization.

The first section 3401 is the PDCP header composed of:
One bit indicating if the information embedded in the data section 3403 is user data or control data,
PDCP Sequence Number (SN),
Some reserved (R) bits,
In one embodiment of the invention, a NC information 3405 bit is present in the header. In one embodiment of the invention, this additional bit (compared to the standardized header), indicates if the packet is NC encoded or not. In another embodiment, this additional bit (compared to the standardized header), indicates the presence or absence of the NC header 3402. In another embodiment of the invention, this additional bit (compared to the standardized header), indicates whether a NC suspend, resp. resume, action should be performed.

The second part 3402 is a NC header when packet contains user data and when the NC activation bit is set to '1'.

In one embodiment of the invention, field 3402 includes an information on whether NC suspend action is to be performed (in relation with FIG. 11, 12, 14 or 15).

In one embodiment of the invention, field 3402 includes an information on whether NC resume action is to be performed (in relation with FIG. 11, 12, 14 or 15).

In one embodiment of the invention, field 3402 includes an information on when the NC suspend, resp. resume, action is to be performed (in relation with FIG. 11, 12, 14 or 15). This may include an identifier of the first data packet to be NC encoded (in case of a NC resume) or not to be NC encoded (in case of a NC suspend). In one embodiment of the invention, the aforementioned identifier is a sequence number (SN) associated to the data packet.

The third section 3403 contains the payload data.

The fourth section 3404 is the packet trailer which embeds the hash information necessary for the verification of the data integrity.

Figure 35:
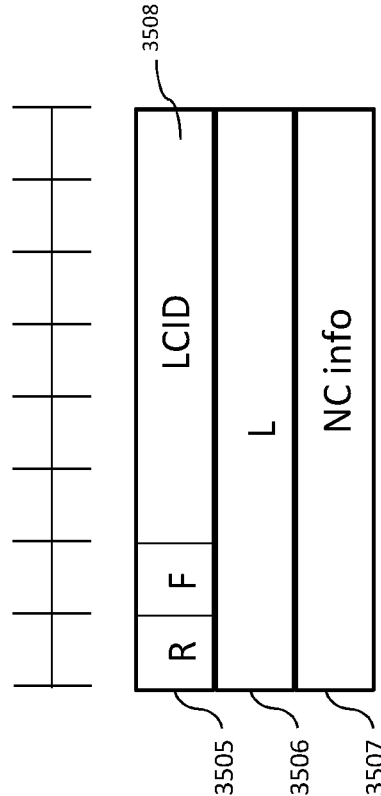
FIG. 35 illustrates the format of a MAC Control Element header according to an embodiment of the invention.

FIG. 35 illustrates the format of a MAC Control Element header 3500 according to one embodiment of the invention. It reuses the MAC CE format as defined in the specification TS38.321, issued by the 3GPP organization, as sub-headers of the MAC encapsulation. Logical Channel IDs 3505 identifies the kind of sub-header and fixes the length of this sub-header. R indicates a Reserved bit, F indicates whether the length L of the sub header is coded on 8 bits or 16 bits. In one embodiment of the invention, the length of the field L 3506 is 8 bits.

In one embodiment of the invention, the Suspend/Resume Information field 3507 is absent. In such case, this information applies to all existing DRBs established between the UE and the base station. In such case, the LCID field 3508 indicates if the message is a suspend/resume request (e.g. message 1003), a suspend/resume command, or a suspend/resume confirmation/acknowledge.

In another embodiment of the invention, the field 3507 is 1 Byte, with each bit Di indicating the suspend/resume status of the Network Coding for DRB i where i is the ascending order of the DRB ID among the DRBs configured with NC. The Di field may be set to 1 to indicate that NC for DRB i shall be resumed. The Di field may be set to 0 to indicate that NC for DRB i shall be suspended.

In another embodiment of the invention, the field 3507 is 1 or 2 bytes, the LCID field 3508 indicating only that the message is related to Network Coding suspend/resume operations, and one of the bytes, or a part of a byte indicates if the message is a suspend/resume request (e.g. message 1003), a suspend/resume command, or a suspend/resume confirmation/acknowledge. The other byte or the other part of it contains several bits, each bit Di indicating the suspend/resume status of the Network Coding for DRB i where i is the ascending order of the DRB ID among the DRBs configured with NC. The Di field may be set to 1 to indicate that NC for DRB i shall be resumed. The Di field may be set to 0 to indicate that NC for DRB i shall be suspended. This is not limitative, any combination with a minimal number of bits can be used to carry the suspend/resume operations.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of wireless communication between a base station and a user equipment via a plurality of data radio bearers, the method comprising:

receiving a network coding control element; and controlling activation or deactivation of network coding in response to the reception of the network coding control element, wherein the controlling comprises determining an indication of when a network coding activation or deactivation takes effect, the indication including an identifier of a first data packet for which a network coding is activated or deactivated; and determining the data radio bearers of the plurality of data radio bearers for which network coding is to be activated or deactivated.

2. The method of claim 1, wherein the receiving and the controlling are executed by the base station, the network coding control element being transmitted by the user equipment.

3. The method of claim 1, wherein the receiving and the controlling are executed by the user equipment, the network coding control element being transmitted by the base station.

4. The method of claim 3, wherein the method further comprises:

transmitting by the user equipment to the base station of a request for the network coding activation or deactivation prior to the transmission of the network coding control element by the base station.

5. The method of claim 3, wherein the method further comprises:

transmitting by the user equipment to the base station, upon reception of the network coding control element, of an acknowledge message to acknowledge the reception of the network coding control element.

6. The method of claim 3, wherein the method further comprises: transmitting by the user equipment to the base station of a status report prior to the transmission of the network coding control element by the base station.

7. The method of claim 1, wherein the network coding control element is embedded in a Media Access Control Control Element.

8. The method of claim 1, wherein the network coding control element is embedded in a header of a Packet Data Convergence Protocol message.

9. The method of claim 1, wherein the network coding control element is embedded in a Radio Resource Control message.

10. The method of claim 1, wherein the method further comprises:

checking the need for the network coding activation or deactivation prior to transmitting the network coding control element.

11. The method of claim 1, wherein controlling deactivation of network coding consists of suspending encoding of data packets according to a predefined network coding configuration.

12. The method of claim 1, wherein controlling deactivation of network coding consists of suspending decoding of data packets according to a predefined network coding configuration.

13. The method of claim 1, wherein controlling activation of network coding consists of resuming encoding of data packets according to a predefined network coding configuration.

14. The method of claim 1, wherein controlling activation of network coding consists of resuming decoding of data packets according to a predefined network coding configuration.

15. The method of claim 1, wherein the controlling comprises transmission of a network coding activation or deactivation notification, and the network coding activation or deactivation notification comprises an information on data radio bearers for which network coding is to be activated or deactivated.

16. The method of claim 15, wherein the network coding activation or deactivation notification is embedded in a header of a Packet Data Convergence Protocol message.

17. A non-transitory computer-readable storage medium storing instructions of a computer program for implementing a method according to claim 1.

18. A user equipment device for wireless communication with a base station via a plurality of data radio bearers, wherein the user equipment device comprises a processor configured for:

receiving a network coding control element; and controlling activation or deactivation of network coding in response to the reception of the network coding control element, wherein the controlling comprises determining an indication of when the network coding activation or deactivation takes effect, the indication being including an identifier of a first data packet for which the network coding is activated or deactivated; and determining the data radio bearers of the plurality of data radio bearers for which network coding is to be activated or deactivated.

19. A base station device for wireless communication with a user equipment via a plurality of data radio bearers, wherein the base station device comprises a processor configured for:

receiving a network coding control element; and controlling activation or deactivation of network coding in response to the reception of the network coding control element, wherein the controlling comprises indicating when the network coding activation or deactivation takes effect, the indication being including an identifier of a first data packet for which the network coding is activated or deactivated; and determining the data radio bearers of the plurality of data radio bearers for which network coding is to be activated or deactivated.

20. The method of claim 1, wherein in a case where the controlling is controlling of deactivation of network coding, the network coding control element is included in a packet that is not network coded; and in a case where the controlling is controlling of activation of network coding, the network coding control element is included in a packet that is network coded.

21. The method of claim 1, wherein the controlling comprises indicating the one or more radio bearers of the plurality of bearers for which network coding is to be activated or deactivated.

22. The method of claim 21, wherein the indication of the one or more bearers includes a plurality of indications corresponding to the plurality of radio bearers.

* * * * *